United States Patent [19]
Ross et al.

[11] 3,837,774
[45] Sept. 24, 1974

[54] APPARATUS FOR MOLDING RIGID PRODUCT FROM SYNTHETIC RESINOUS MATERIAL

[75] Inventors: Lee F. Ross, Los Gatos; James E. Wilkinson; Fred A. Craig, both of San Jose; Allan M. Hudson, Mountain View, all of Calif.

[73] Assignee: Thiokol Corporation, Bristol, Pa.

[22] Filed: Dec. 1, 1972

[21] Appl. No.: 311,088

Related U.S. Application Data

[62] Division of Ser. No. 107,174, Jan. 18, 1971, Pat. No. 3,736,089.

[52] U.S. Cl.............. 425/144, 425/150, 425/164, 425/371, 425/817 C
[51] Int. Cl............................................. B29c 3/06
[58] Field of Search........ 425/4 C, 817 C, 371, 143, 425/144, 142, 164, 136, 150, 151, 155; 164/4, 154; 264/40

[56] References Cited
UNITED STATES PATENTS

| | | | |
|---|---|---|---|
| 3,017,662 | 1/1962 | Marsh | 264/40 X |
| 3,400,426 | 9/1968 | Boggs | 425/136 X |
| 3,435,102 | 3/1969 | Sullhofer | 425/4 C X |
| 3,601,854 | 8/1971 | Trueblood | 425/155 |

Primary Examiner—R. Spencer Annear
Assistant Examiner—Mark Rosenbaum
Attorney, Agent, or Firm—Thomas W. Brennan

[57] ABSTRACT

A machine operable to produce molded synthetic products in finished form in a continuous process, including mixing, pouring, molding, and curing the resultant product.

6 Claims, 21 Drawing Figures

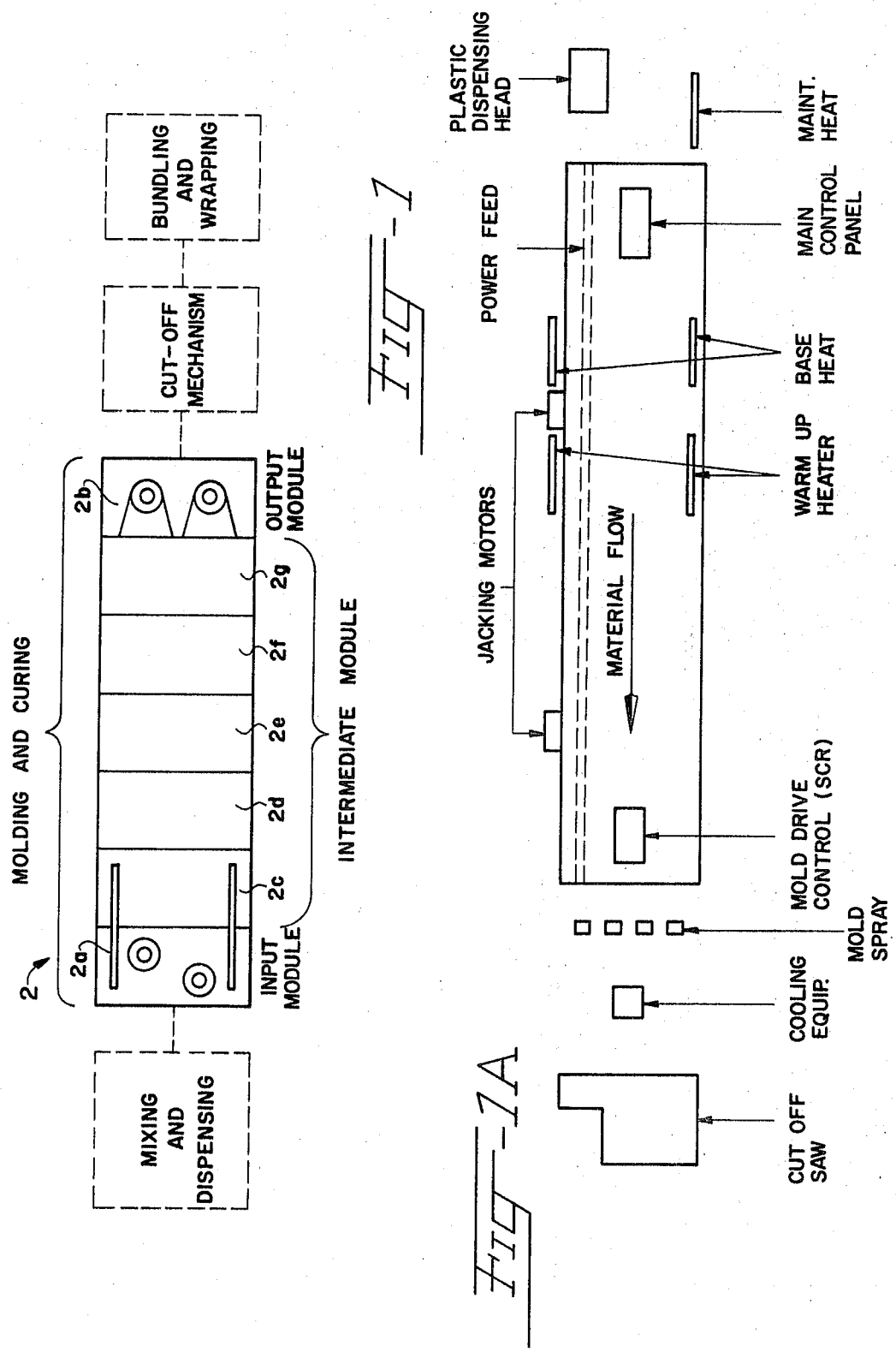

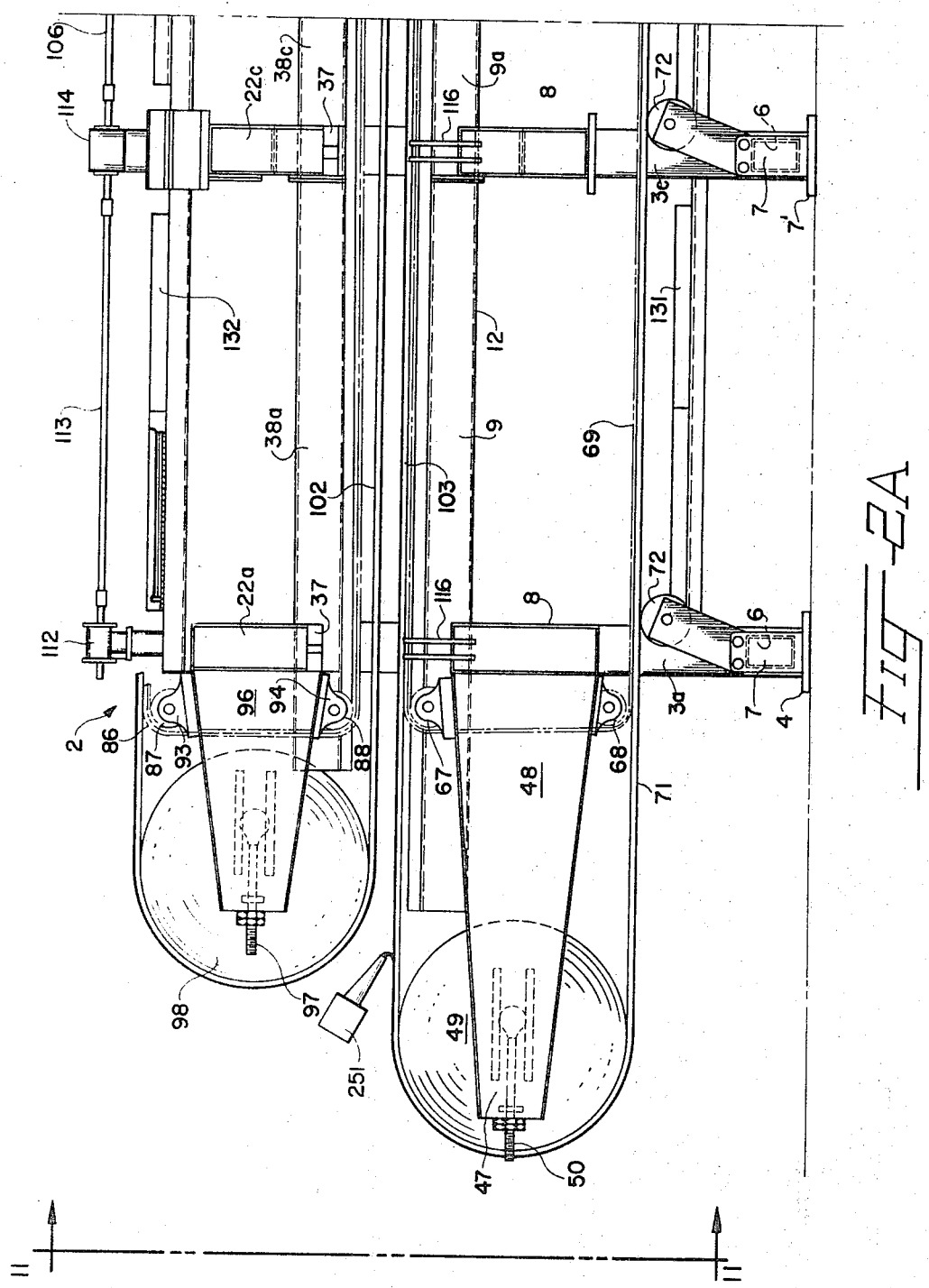

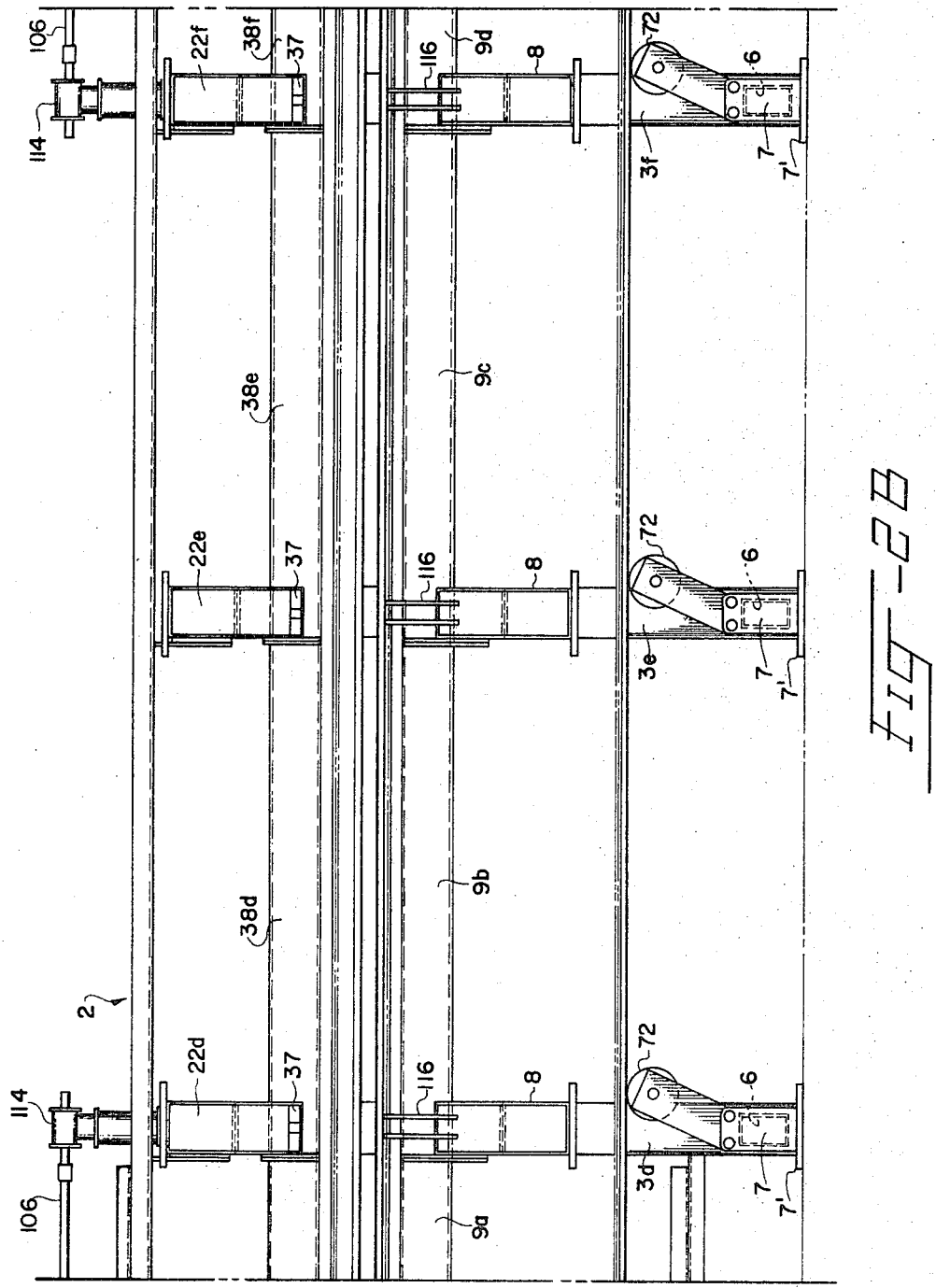

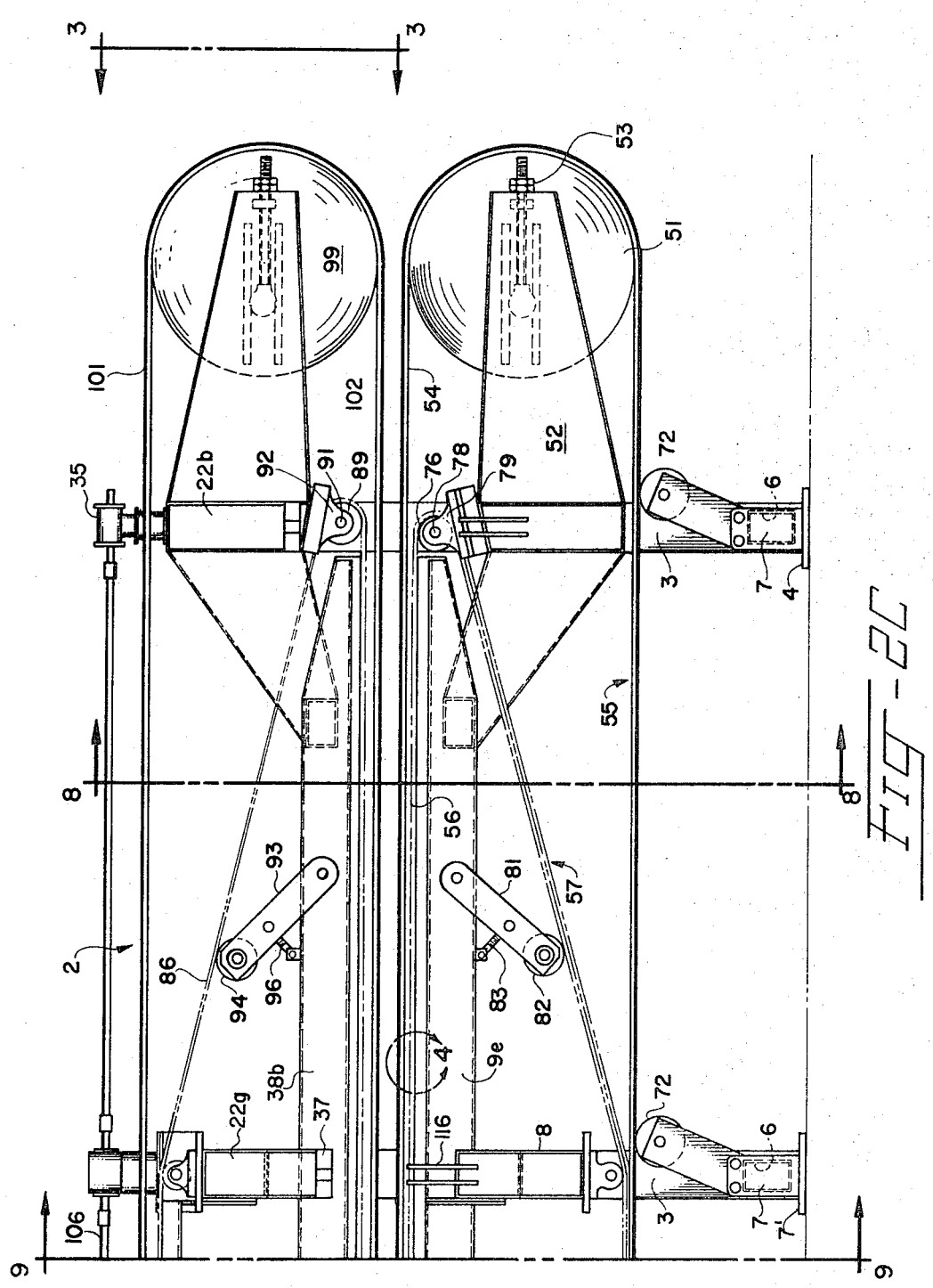

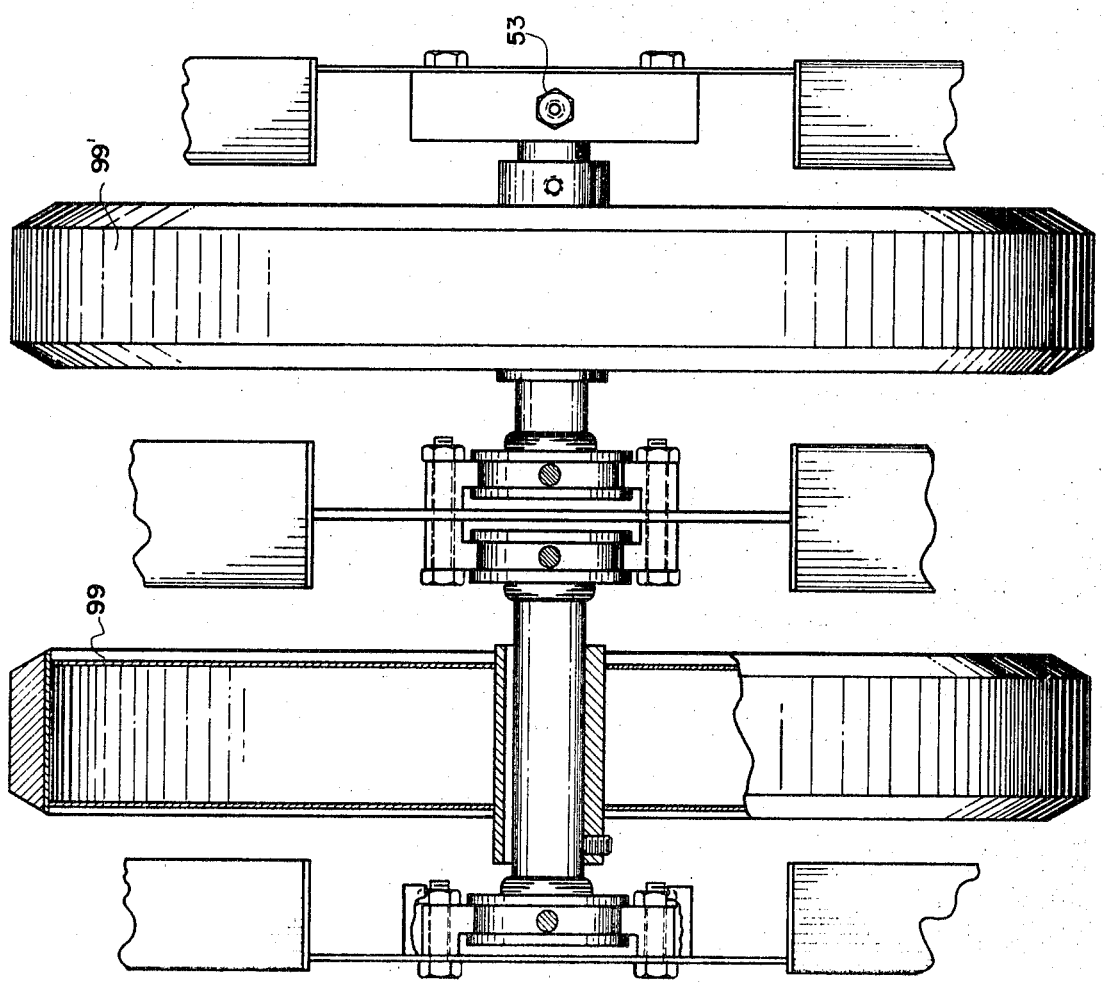

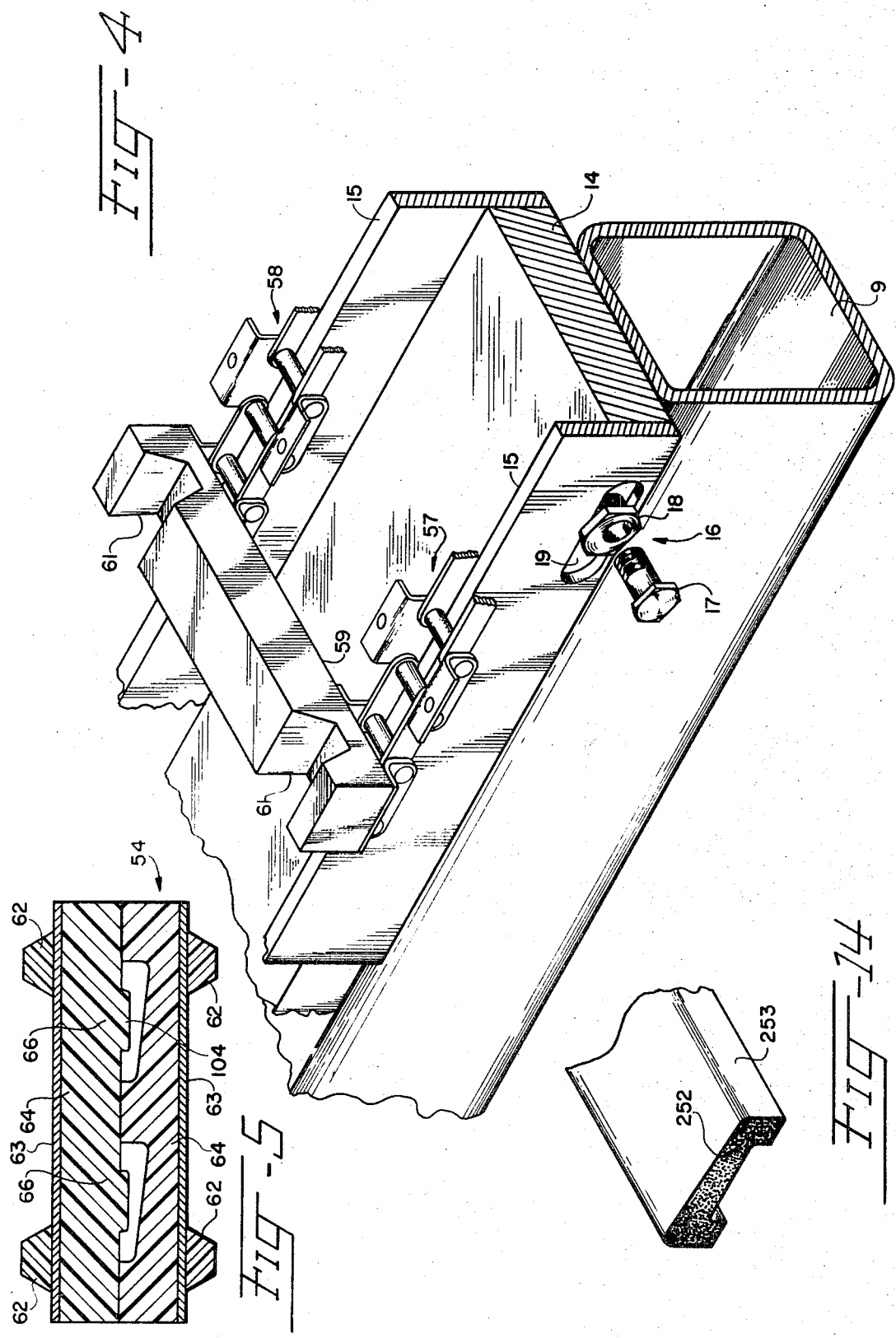

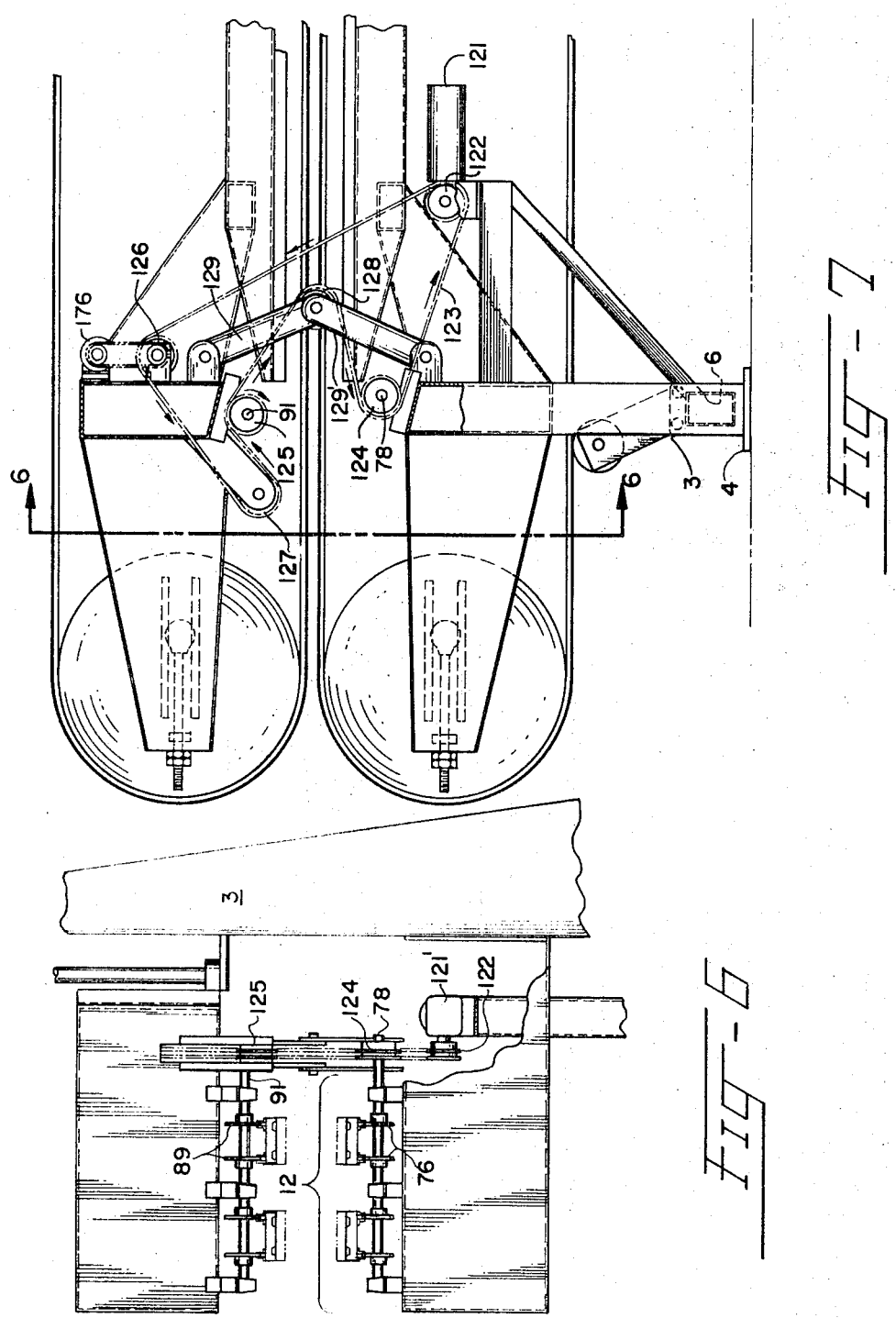

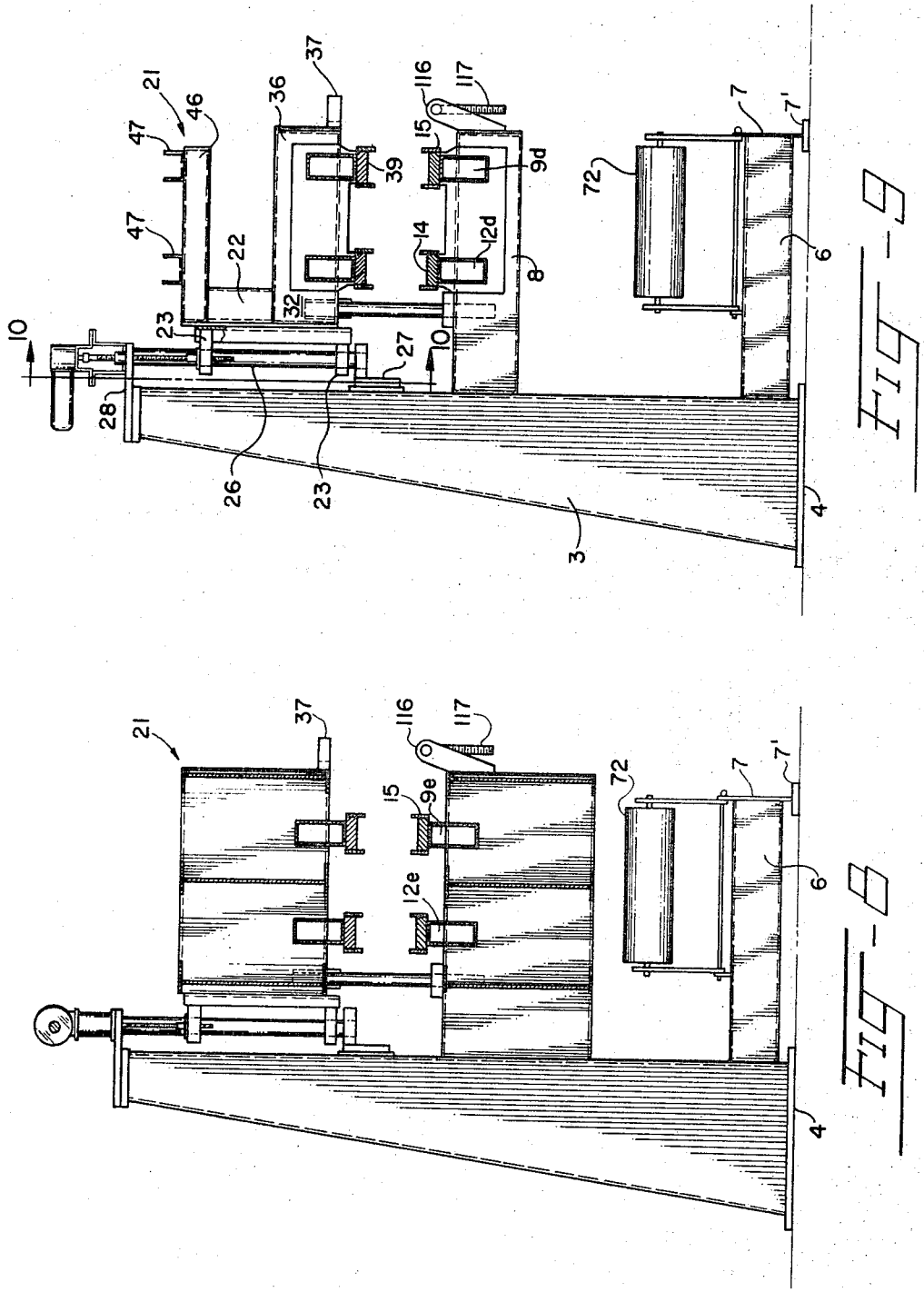

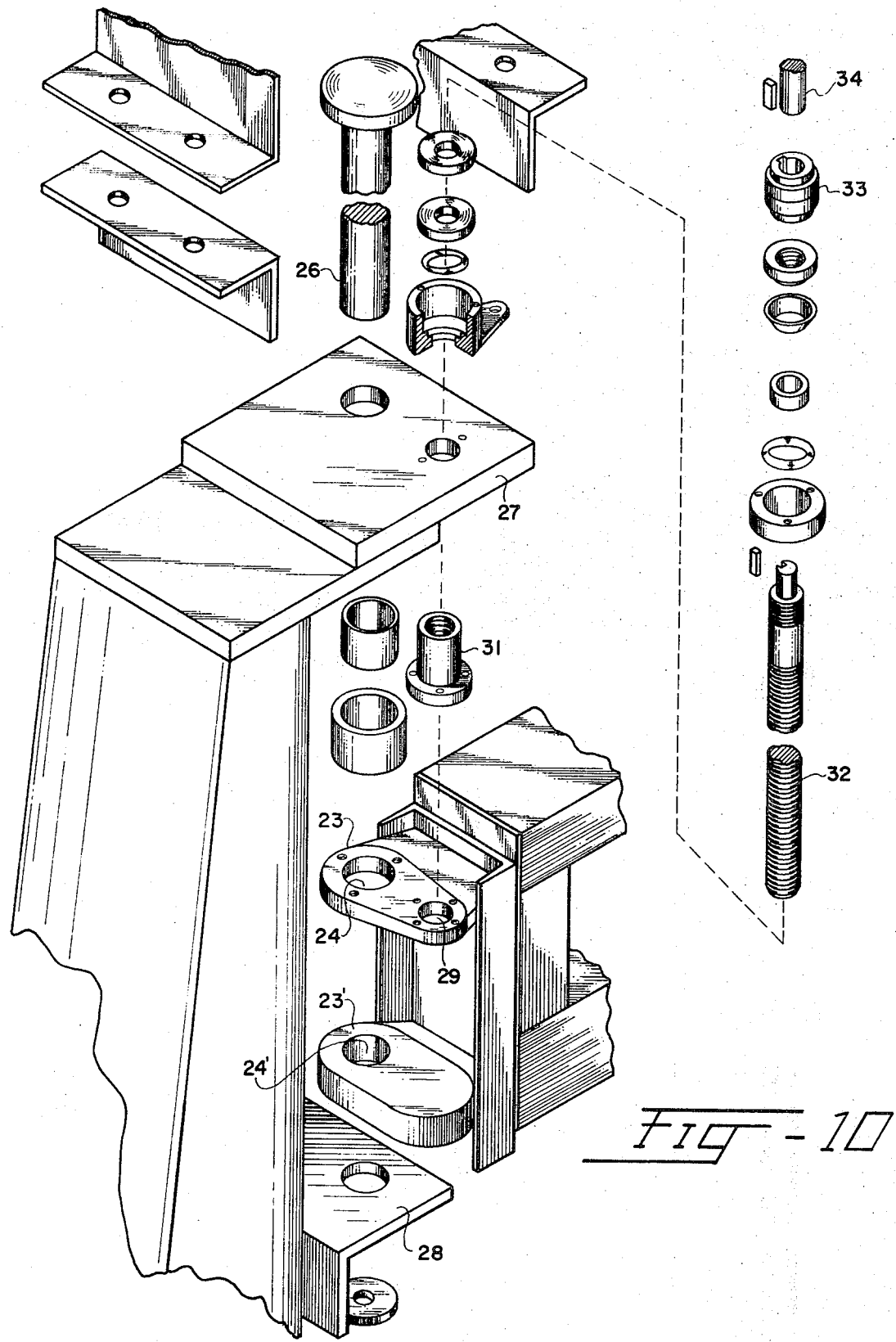

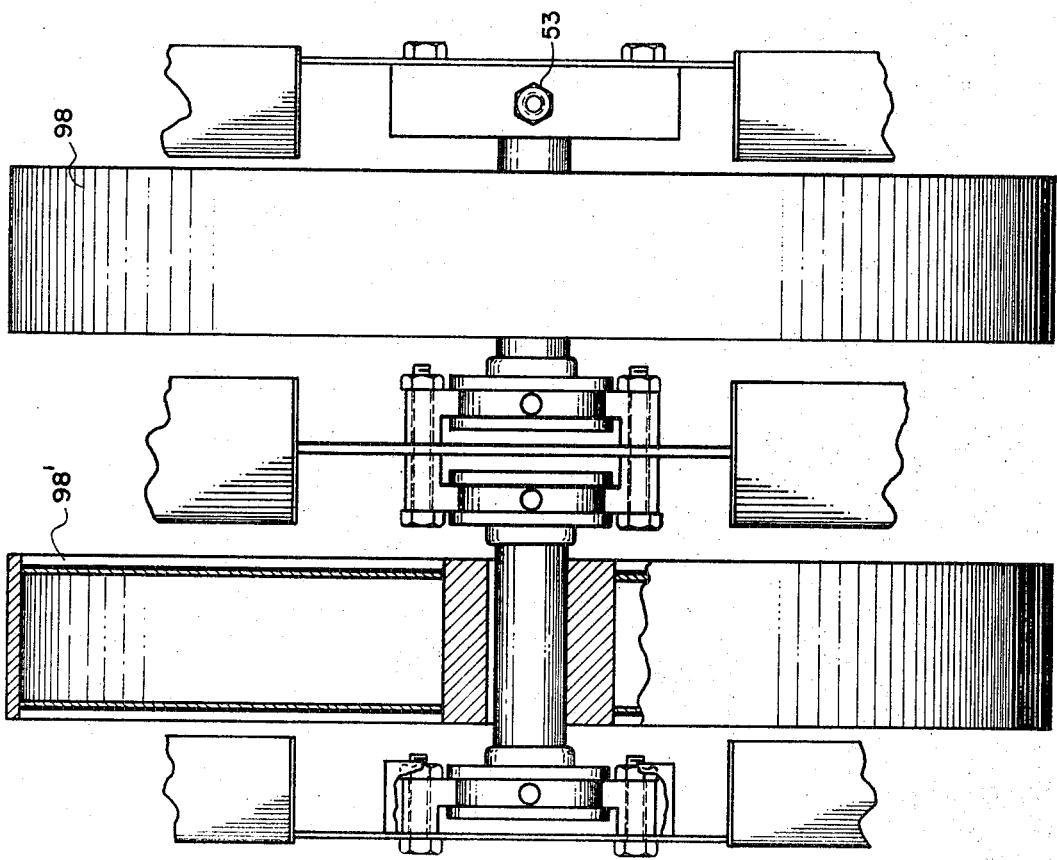

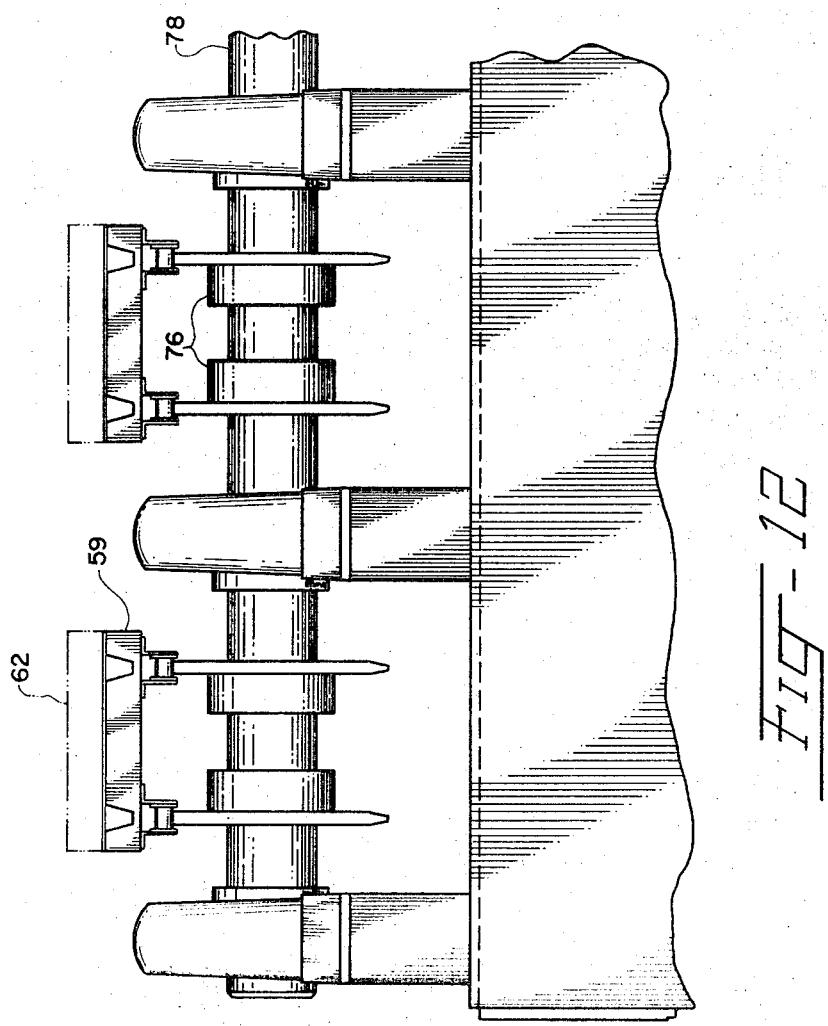

CONTROL WIRING IN SAW

APPARATUS FOR MOLDING RIGID PRODUCT FROM SYNTHETIC RESINOUS MATERIAL

This is a divisional, of application Ser. No. 107174 filed Jan. 18, 1971 now U.S. Pat. No. 3,736,089.

BACKGROUND OF THE INVENTION

As our natural resources such as wood become more and more scarce, and as labor costs increase in the lumber industry, the cost of natural building materials for the construction industry will increase to the point where synthetic products, which are conventionally milled from wood, may economically and to good structural advantage be produced through use of continuous mechanical processes using synthetic materials. Accordingly, it is one of the objects of the invention to provide an apparatus operable to produce continuously in elongate form any selected structural, non-structural or decorative member.

One of the difficulties that must be overcome when marketing a synthetic product, as opposed to a natural product, is the sales resistance that many people have toward a synthetic product. Accordingly, it is an advantage in marketing synthetic products that they resemble the natural product. Accordingly, it is another object of the present invention to provide an apparatus and method by which a product may be produced in a continuous process from synthetic materials, the finished product being susceptable of treatment to resemble the natural product.

Foam type synthetic materials, such as polyurethane foams have heretofore been produced in continuous processes, the end product usually being a substantial slab or bun of the expanded cellular synthetic product. United States Patents 3,296,658; 3,325,573; 3,354,503; 3,325,823; 3,475,522 and 3,476,845 teach different methods and apparatus for casting such expanded cellular synthetic resinous slabs or buns.

Other products have, of course, been manufactured from plastics. For instance, United States Patents 2,956,315 and 3,100,917 describe window and door frames fabricated from extruded plastic material. United States Patents 3,220,062 and 3,274,741 teach the manufacture of products fabricated from synthetic resinous material and used in the construction industry.

All of these patents, however, teach the use of an extrudable plastic compound formed into its ultimate configuration as a result of the extrusion process.

Still other patents, namely United States Patents 3,071,180; 3,178,768; 3,323,167; 3,408,690 and 3,422,178 teach methods and apparatus for forming articles from foamed polymeric materials such as expandable polystyrene beads. In general, these patents teach a process and apparatus permitting the charging of a mold with the polystyrene beads and the subsequent subjection of the beads to elevated temperatures as through the application of steam to effect expansion of the beads.

United States Patents 2,817,875 and 2,835,924 teach methods and apparatus for the continuous molding of flexible rubber foam latex strips such as might be used in the formation of flexible seals for refrigerator doors or weather stripping for automobiles and doors.

None of the patents noted above relate to the use of polyurethane type foam materials in the formation of the end product. The use of this type material and the product formed from such material in a continuous process is generally described in U.S. Pat. Nos. 3,078,505, 3,254,464 and 3,265,786. In the first two of these latter patents, there is described an end product that constitutes a lamination of a polyurethane type foam material with a more dense sheet material caused to adhere to the polyurethane foam to form a "skin." As explained in Pat. No. 3,078,505, the skin coating material may be bonded to the foam body during manufacture. In Pat. No. 3,254,464, the interior of the panel described therein constitutes a rigid plastic foam with cover sheets intimately bonded thereto. So far as is known, synthetic foam materials have not been used to form rigid structural members having an exterior "skin" formed of the same material and in a continuous process. Accordingly, it is one of the objects of the invention to produce in a continuous process a foam product having a predetermined internal density such as to render the product rigid, while possessing an exterior "skin" formed of the same material but of relatively greater density to provide a tough exterior surface.

So far as is known, apart from the present invention, apparatus has not been devised which may be used with many different types of curable liquid or foam type synthetic materials. Accordingly, another object of the invention is the provision of an apparatus and process suitable for use with any curable liquid or plastisol, for example, styrene polyester (with or without glass fibers), melamine formaldehyde, urea formaldehyde, polysulfide liquid polymers, curable silicone liquids, curable polybutadiene polymers, epoxy resins and other foaming systems such as foamed vinyls, foamed phenolics and foamed epoxy.

Another object of the invention is the provision of modular apparatus for continuously forming elongated rigid synthetic products.

In the continuous production of elongated rigid synthetic products, one of the problems is to secure separation of the product from the mold in which it is formed. Accordingly, it is another object of the invention to provide a method and means for insuring rapid and continuous separation of the product from the mold parts.

A problem frequently encountered in the continuous production of condensed foam materials into rigid structural members is the necessity to maintain the mold parts at a temperature such that the foam material contained within the mold will condense to the desired degree while "curing" to provide the requisite rigidity. Accordingly, it is a still further object of the invention to provide apparatus including movable endless mold parts capable of being heated and maintained at a predetermined temperature for a predetermined time to effect the curing of foam material contained within the mold at a predetermined pressure.

In a continuous production apparatus for the curing of synthetic materials, it is necessary that the mold belts forming the mold cavity be of substantial length so as to permit the material being cured to be confined for the requisite predetermined curing interval. The length of such belts makes it difficult to apply and remove the belts when it is desired to mold products of different configuration. Accordingly, it is a still further object of the invention to provide an apparatus constructed in a manner to permit the application and removal of the mold belts in an expeditious manner.

In the production of rigid elongated molded synthetic products, it is important that the mold parts be retained immovable with respect to each other for a considerable interval while the mold parts are moved along at a predetermined rate so as to confine the synthetic material in a mold cavity having constant volume during the curing process. To effect such control, the mold parts, when formed from adjacent reaches of endless mold belts, each comprising the complementary parts of a closed mold, are pressed together with constant pressure while being moved along during the curing process. Accordingly, it is a still further object of the invention to provide apparatus for retaining a pair of mold belts in juxtaposed clamped cavity-forming position over an extended length, and means for selectively varying the pressure upon the mold parts.

In the operation of a continuous process molding apparatus such as the one described herein, it is important that the apparatus have the capability of being converted to mold many different configurations from many different kinds of synthetic materials. Such versatility requires that appropriate control devices and circuits be incorporated which are susceptable of adjustment in correlation with the configuration and kind of material being run. Accordingly, it is a still further object of the invention to provide a continuous molding apparatus which incorporates the requisite controls to provide the versatility discussed.

Various types of plastic or synthetic resinous materials have been used to form laminated structures or products having a high degree of rigidity. So far as is known, foam type synthetic materials have not been used to form rigid structural configurations in the absence of a separate adherent "skin." Accordingly, it is an important object of the present invention to provide a product constituted of condensed foam type synthetic material possessing a predetermined internal density of about 8 pounds per cubic foot and an integral "skin" formed from the same material and having a density of about 12 pounds per cubic foot.

The invention possesses other objects and features of advantage, some of which, with the foregoing, will be apparent from the following description and the drawings. It is to be understood, however, that the invention is not limited to the embodiment illustrated and described as it may be embodied in various forms within the scope of the appended claims.

BRIEF SUMMARY OF THE INVENTION

In terms of broad inclusion, the apparatus and method for forming elongated, rigid products from synthetic resinous material comprises apparatus for mixing and dispensing the constituent materials required to form the end product, an elongated modular framework upon which is rotatably disposed a continuous mold belt forming one-half of an elongated mold cavity, the other half of which is formed from a complementary elongated belt suitably supported on the frame for movement into and out of engagement with the other half of the mold belt to effect formation of the cavity. Heater means are provided in conjunction with the mold belts to maintain the temperature of the molds at a relatively constant level appropriate to the curing requirements of the synthetic resinous material being formed. Control means are also provided interconnected between the mixing and dispensing means, the heating means and the mechanical drive means of the mold to effect interruption of all processes if any one function of the machine is performed in a substandard manner.

With respect to the process by which foam material is caused to become a rigid structural member, rigidity of the final product is dependent upon density of the cured material, and density is dependent upon the quantity of constituents admitted to a mold cavity of predetermined crosssectional area, the rapidity and length of time that such material is permitted to expand and cure, and the pressure generated in the material during curing. Accordingly, the apparatus described hereinafter is designed to selectively optimize these conditions so that the ultimate product possesses the requisite density and rigidity.

DESCRIPTION OF DRAWINGS

FIG. 1 is a schematic view in block diagram form illustrating the mixing and dispensing equipment (dash lines) in conjunction with the molding and curing apparatus (full lines) and a cutoff mechanism and bundling and wrapping assembly, the latter two being shown in dash lines.

FIG. 1A is a schematic overall view showing in general the positional relationships of various of the major components of the apparatus. Legends have been applied for clarity.

FIG. 2A is a side elevational view of a portion of the input end of the molding and curing apparatus.

FIG. 2B is a continuation of the view illustrated in FIG. 2A and constitutes a side elevational view of an intermediate portion of the molding and curing apparatus.

FIG. 2C is a continuation of the view illustrated in FIG. 2B, and constitutes a side elevational view of the discharge end of the molding and curing apparatus.

FIG. 3 is an enlarged end elevation partly in vertical section taken in the plane indicated by the line 3—3 in FIG. 2C.

FIG. 4 is an enlarged fragmentary perspective view of a short section of the continuous chain assembly and chain guides, illustrating a mold belt guide block mounted on the chain assembly.

FIG. 5 is a vertical cross-sectional view of a pair of cooperating mold belts illustrating a pair of mold cavities and the guide ribs for guiding the mold belts.

FIG. 6 is a vertical cross-sectional view taken in the plane indicated by the line 6—6 in FIG. 7.

FIG. 7 is a side elevational view of the discharge end of the molding and curing apparatus from the side opposite the side shown in FIG. 2C and illustrating the single drive mechanism for upper and lower mold belts and associated guide chains. The guide chains are omitted from this view for clarity.

FIG. 8 is a vertical cross-sectional view through the apparatus taken in the plane indicated by the line 8—8 in FIG. 2C and illustrating the method of raising and lowering one mold belt and guide means therefor in relation to the other mold belt and guide means to effect separation of mold belts. Some of the structure is omitted for clarity.

FIG. 9 is a view similar to FIG. 8 but taken in the plane indicated by the line 9—9 in FIG. 2C.

FIG. 10 is an exploded view in perspective illustrating the details of construction of the elevator means for the auxiliary frame supporting one of the chain guides and mold belts.

FIG. 11 is an end elevational view partly in vertical section taken in the plane indicated by the line 11—11 in FIG. 2A and illustrating the input end of the molding and curing apparatus. Portions of the structure are broken away to show the underlying structure.

FIG. 12 is a fragmentary elevational view in enlarged scale of the structure encompassed by the bracket 12 in FIG. 6.

FIG. 14 is a fragmentary perspective view illustrating a short length of the strip product produced by the apparatus.

DESCRIPTION OF PREFERRED EMBODIMENT

Figure 13A:
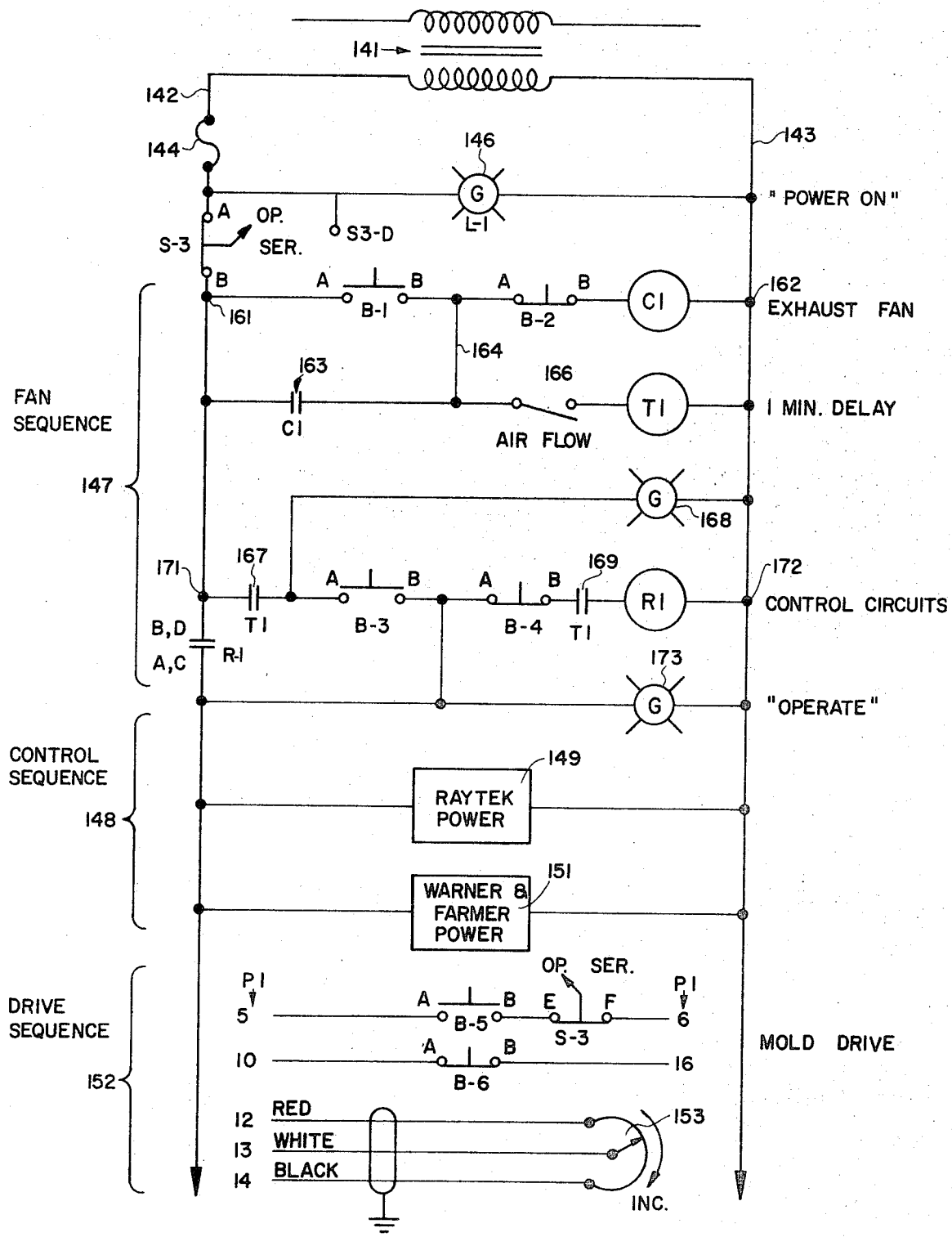
FIG. 13A is a line-to-line schematic illustrating a portion of the control circuit for the apparatus.

Referring to the drawings, FIG. 1 illustrates schematically the molding and curing apparatus forming the subject matter of this invention, shown in full lines, in conjunction with mixing and dispensing apparatus, a cutoff mechanism and a bundling and wrapping device, the latter shown in broken lines since they form no part of the subject invention. FIGS. 2A, 2B and 2C illustrate in side elevation the entire length of the novel apparatus for continuously molding and curing a novel synthetic resinous product by a process believed to be novel.

The molding and curing apparatus includes a modular main frame assembly designated in its entirety by the numeral 2, and constituting the cooperative association of a modular input section 2a, a modular output section 2b, and modular intermediate sections 2c, 2d, 2e, 2f and 2g. The modular construction indicated is desirable to lend versatility to the apparatus in handling different type materials requiring different cure times, enabling selective overall extension or contraction of the length of the apparatus by insertion or removal of intermediate sections.

The main frame assembly includes longitudinally spaced, vertically extending structural steel support standards 3a and 3b associated, respectively, with input and output sections 2a and 2b, each of the standards being provided with base pads 4 equipped with conventional leveling devices (not shown). Additional support standards 3c, 3d, 3e, 3f and 3g are provided equally spaced between the support standards 3a and 3b. Each of the support standards is provided adjacent its lower end with a transversely extending cantilever beam 6, preferably having one end welded to the associated standard, and preferably formed from structural steel having a box cross section to provide the requisite rigidity. The free end of each cantilever beam is welded to a support plate 7 having a pad 7' at its lower end and projecting above the associated beam at its other end for purposes which will hereinafter be explained.

Between the top and bottom ends of the vertical standards, above each beam 6 and generally in planar alignment therewith, there is provided a second transversely extending cantilever beam 8, similar in construction to the beam 6, and where appropriate having approximately twice the depth to provide adequate rigidity.

To achieve a rigid modular construction, the transversely extending cantilever beams 8 on adjacent support standards are tied together by parallel longitudinally extending transversely spaced pairs of stringer beams 9 and 12 associated with frame section 2a, 9a and 12a associated with main frame section 2c, 9b and 12b associated with main frame section 2d, 9c and 12c associated with main frame section 2e, 9d and 12d associated with main frame section 2f, and 9e and 12e associated with output section 2b.

Referring to FIG. 2A, it will there be seen that stringer beams 9 and 12, associated with the input section 2a, are welded in recesses formed in the associated cantilever beam 8 supported on standard 3a and project to the left of the vertical standard (as viewed in FIG. 2A) in a short cantilever extension. At their other ends the stringer beams 9 and 12 are provided with flat anchor flanges 13, adapted to be detachably anchored to the next adjacent main frame section 2c, including support standard 3C. Each of the pairs of stringer beams associated with each main frame section is in like manner welded to an associated support standard and detachably anchored to the next adjacent main frame section by a flange 13, thus enabling as many intermediate sections to be interposed in the structure as is desirable or necessary.

As shown in FIGS. 8 and 9, the pairs of stringer beams are spaced apart, the stringer beams 9 being next adjacent the associated vertical standard while the stringer beams 12 lie next adjacent the outboard ends of cantilever beams 8. It will thus be seen that the main frame assembly is rendered rigid and free standing by virtue of the interconnection of the cantilever beams by the longitudinal stringer beams.

Welded to the top surface of each of the longitudinally extending stringer beams is a generally rectangular bar 14 coextensive in length with each associated stringer. For purposes which will hereafter be explained in greater detail, each of the bars 14 is provided along opposite side edges with longitudinally extending chain rails 15 each of the chain guide rails being formed from appropriate bar stock and being adjustably mounted on the associated bar 14 so that the upper edge of each of the chain guide bar rails extends above the upper surface of the supporting bar.

Adjustability of the chain guide rails vertically with respect to the associated bar 14 is provided by an eccentric nut assembly designated generally by the numeral 16 and comprising a cap screw 17 threadedly engaged with the bar 14, and an eccentric bearing unit 18 rotatably disposed on the cap screw and rotatably adjustable in an elongated slot 19 formed in the rail to raise or lower the associated guide rail. Once the height of the upper edge of each guide rail has been adjusted to coincide with the upper edges of all the other associated chain guide rails the cap screws 17 are tightened to lock the eccentric unit in adjusted position. This construction is best shown in FIG. 4. Following adjustment of the separate chain guide rails, their top edges will lie in a common horizontal plane.

Supported on the main frame assembly is an auxiliary frame designated generally by the numeral 21. The auxiliary frame, like the main frame, is made up of joinable frame sections or modules 21a, 21b, 21c, 21d, 21e, 21f, and 21g, correlated, respectively, to main frame sections 2a, 2b, 2c, 2d, 2e, 2f and 2g. The entire auxiliary frame, once assembled, is supported in cantilever fashion for vertical movement in relation to the supporting main frame assembly and in relation to the underlying cantilever beams 8 and attached stringer beams.

The auxiliary frame comprises a series of axially spaced vertical support posts 22a, 22b, 22c, 22d, 22e, 22f and 22g, each having transversely extending lugs 23 and 23' projecting from opposite ends toward the associated vertical support standard 3 of the main frame assembly. Each pair of lugs is provided with vertically aligned apertures 24 and 24' to receive a vertical bearing shaft 26 fixedly supported at opposite ends on brackets 27 and 28, fixed to the associated vertical standard. As shown in FIG. 10, lug 23 is also provided with a second aperture 29 through which extends a ball bearing sleeve 31 adapted to work with ball spindle 32 to raise or lower the associated support post, which is guided in its movement by shaft 26. At its upper end, the ball spindle is rotatably journaled in bearing bracket 27 rigidly secured to the upper end of the associated main frame standard. Rotation of the spindle is effected by a drive collar 33 keyed to the spindle 32 and keyed also to the drive shaft 34 of a motor 35.

Each support post 22 is provided at its lower end with a transversely extending cantilever beam 36, the inboard end of which is rigidly welded to the vertical support post, while its outboard end is provided with a bifurcated latch bracket 37 for use in a manner which will hereinafter be explained. Extending longitudinally between the transversely extending cantilever beams 22 of the auxiliary frame 21, and associated with the separate auxiliary frame modules, are pairs of stringer beams: 38a–39a associated with the auxiliary frame section 21a, and 38b–39b associated with auxiliary frame section 21g. Additional stringer beams 38c–39c, 38d–39d, 38e–39e, and 38f–39f are provided corresponding to the intermediate sections of the frame, each pair being welded at one end to one of the transversely extending beams 22, and the other ends having flanges 41 for detachable securement to the next adjacent section of the auxiliary frame.

After assembly of the auxiliary frame sections or modules, the transversely extending cantilever beams 22 and stringers 38–39 are positioned to overlie in planar alignment the corresponding underlying transversely extending beams 8 of the main frame and the stringer beams 9–12 associated therewith. As with beams 9–12, each of the beams 38–39 is provided with a longitudinally extending support bar 42 opposite side edges of each of which is provided with an adjustable chain guide rail 43 adjustable in the manner previously explained with regard to chain guide 15.

At the upper end of each vertical support post 22 of the auxiliary frame, there is provided a transversely extending cantilever beam 46 superimposed over and in planar alignment with beams 36, and provided with longitudinally extending angle bars 47 extending between the cantilever beams 46. It will thus be seen that the angle bars cooperate with cantilever beams 36 and 46 to form a very rigid auxiliary frame assembly which may be raised or lowered as a single unit in relation to the main frame assembly.

At one end of the main frame assembly there is provided axially extending pulley support brackets 48, spaced transversely and welded at one end to the input end standard 3a of input section 21a as illustrated in FIG. 2A. The pulley brackets rotatably support a pulley 49 as shown. The pulley is adjustably supported on the support bracket by an appropriate take-up bearing assembly, the adjustable spindle 50 of which is illustrated to the left of the pulley bracket in FIG. 2A.

With respect to this lower portion of the main frame assembly, a second pulley 51 is provided at the other or discharge end of the assembly, illustrated in FIG. 2C. As there shown, the pulley 51 is adjustably supported on an axially extending pulley support bracket 52 by an adjustable bearing assembly, the shaft 53 of which is illustrated to the right of the support bracket. The axis of rotation of pulleys 49 and 51 is correlated to the diameters of the pulleys so that the upper reach 54 of a mold belt 55 is disposed for rotation with the pulleys 49 and 51 will lie superimposed over and in axial alignment with the upper reach 56 of an endless chain assembly 57 movably supported along the chain guide rails 15, as illustrated in FIG. 4.

To effectively drive and guide each mold belt 55, each chain assembly is preferably fabricated from a pair of chain strands 58 and 58' interconnected by a series of guide blocks 59 having appropriately milled slots 61 therein adjacent opposite ends and adapted to wedgingly engage complementarily shaped resilient ribs 62 bonded to one side of a stainless steel ribbon 63 on the opposite side of which is bonded the resilient continuous strip 64 within which are formed mold cavities 66.

As illustrated in FIG. 2A, the upper reaches 56 of the chain assemblies are rotatably disposed on sprockets 67 and 68 which change the direction of the chain assemblies to provide support for the lower reaches 69 which, together with the lower reaches 71 of the associated mold belts, are supported on rollers 72 provided for that purpose. At the discharge end of the apparatus (FIG. 2C), the lower reach of each chain assembly runs over a drive sprocket 76 keyed to a drive shaft 78, journaled in bearing 79 as shown. Appropriate tension is maintained in the pair of endless chain assemblies by takeup arms 81 (FIG. 2C) provided with sprockets 82 and adjustment spindles 83.

The auxiliary frame 21 is also provided with a pair of endless chain assemblies designated generally by the numeral 86, and rotatably supported at the input end of the apparatus on pairs of sprockets 87 and 88. At the discharge end of the apparatus the chain assemblies pass around appropriate drive sprockets 89. The drive sprockets 89 are keyed to drive shaft 91, which is in turn rotatably disposed on an appropriate bearing 92. Slack in the chain assemblies is taken up by adjustable take-up arms 93 journaled at one end to beams 386–396 and rotatably supporting at the other end appropriate sprockets 94 engaging the associated chain assemblies. Spindle 96 is provided to adjust the position of the take-up arms.

Referring to FIG. 2A, it will there be seen that the pairs of sprockets 87 and 88 are keyed to shafts journaled in bearings 93 and 94, respectively, the bearings being supported in turn on axially extending pulley support brackets 96 on which are mounted take-up bearing assemblies 97, the spindle of which may be rotated to adjust the position of pulleys 98 and 98'. Pulleys 98 and 98' cooperating with the similar pulleys 99 and 99' at the discharge end of the apparatus, rotatably support twin mold belts 101 and 101', the lower reach 102 of each of which is adapted to mate and be closely pressed against the upper reach 54 of mold belt 55 so as to complete the cavities 66 illustrated in FIG. 5.

The mold belts 101 and 101' are preferably fabricated in a manner similar to the mold belts 55 (FIG. 5), i.e., each is provided with longitudinally extending guide ribs 62' bonded to one side of a stainless steel strip 63', while the continuous resilient mold strip 64' on the opposite side thereof is provided with projecting continuous ribs 104 that extend into associated cavities 66 of the mating mold belt 55 to complete the configuration of the product to be molded in the cavity thus formed.

From the foregoing it will be apparent that since a rigid product is being molded as distinguished from a flexible one, it is imperative that the complementary reaches 102 and 54 of mold belts 101 and 55, respectively, run true and horizontal over their entire length so that the product being molded and cured within the cavity 66 is uniform in density and configuration. To effect such uniformity, the chain guide rails 15 and 43 are adjustable over their entire lengths by the cap screw and eccentric nut assemblies previously discussed and illustrated in detail in FIG. 4.

It will also be apparent from the foregoing that from time to time it will be necessary to change the mold belts so as to introduce new and different configurations of cavities for product to be molded. To effect such a change, it is necessary that one mold belt be separated from the other, and that the tension on the mold belts be relieved so as to permit separate removal of each mold belt from its supporting pulleys. It has been found that such a change may be expeditiously accomplished by elevating the auxiliary frame 21 through rotation of elevator spindles 32. Rotation of the spindles in synchronism is effected by appropriate drive motors 35 supported on top of selected support standards of the main frame assembly, connected by appropriate drive shafts 106 to gear reduction units 107 similarly mounted on adjacent main frame standards 3 in position to drive the spindles 32.

Thus, activation of motors 35 effectively raises or lowers the entire auxiliary frame assembly to bring the lower reach 102 of mold belt 101 into complementary abutting relation with the upper reach 54 of mold belt 55. The motors 35 are preferably provided with a torque limiting clutch assembly that limits the amount of pressure that might be imposed between the mold belts and a motor shaft brake to stop the motors quickly when power is removed. Additionally, appropriate limit switches are provided to restrict the extent of movement of the auxiliary frame. Once the upper and lower mold belts are properly adjusted in relation to each other so as to form a continuous moving cavity, it is advantageous that they be locked in this relationship. To accomplish this, each of the transversely extending beams 8 supporting the mold belt 55 is provided with upwardly extending anchor brackets 116 pivotally supporting a threaded latch rod 117 adapted to engage bifurcated latch bracket 37 on cantilever beam 36. The latch rod is securely locked to the latch bracket by a double lock nut assembly (not shown) so as to prevent raising or lowering of the auxiliary frame while in latched condition. It will, of course, be understood that prior to separation of the mold belts by energization of motors 35, the latch rods 117 must be disengaged from the latch brackets. Additionally, the latch rods may be utilized to impose and maintain the requisite amount of pressure between the belts merely by adjusting the position of the double lock nut assembly.

Since the mold belts are driven by their respective pulleys independently of the guide chains which function to restrain the mold belts against transverse displacement, it is desirable that tension in the mold belts be adjusted independently of tension in the guide chains. Accordingly, pulleys 49 and 98 illustrated in FIG. 2A may be moved horizontally to the right or left by appropriate rotation of the spindles 50 and 97 so as to relieve or increase the tension in the associated mold belts. Once tension is removed, the belts may be slipped off the pulleys so as to permit replacement by a different mold belt.

It will, of course, be apparent that it is an advantage that each of the mating mold belts be driven at constant and uniform speed so as to preclude the possibility of slippage between the mated belts. To effect such synchronous movement of the belts, it is desirable that the mold belts be driven from a single source of motive power. Referring to FIGS. 6 and 7, to effectively drive the mated mold belts at a constant rate, there is provided an electric motor 121 provided with a gear reduction unit 121' having a drive sprocket 122 driving a short length of drive chain 123 which in turn synchronously rotates drive sprockets 124 and 125 in the proper direction.

Sprockets 124 and 125 rotate drive shafts 78 and 91, respectively, which through sprockets 76 and 89 drive chains 57 and 86. To effect rotation of sprockets 76 and 89 in the appropriate direction, chain 123 must drive the top of sprocket 89 and the bottom of sprocket 76. This requires a change of direction in chain 123, which is provided by idler sprockets 126 and 127 working in conjunction with take-up sprocket 128. Take-up sprocket 128 is rotatably supported on pivoted arms 129 and 129' which adjust their position to accommodate raising and lowering of the upper auxiliary frame assembly 21 so that both chains and associated mold belts may be effectively rotated even when the mold belts are in spaced-apart relationship as when the auxiliary frame assembly 21 is in elevated position.

Experiments have indicated that the mold belts must be retained at a relatively constant predetermined temperature to effect proper curing of the product being molded. To effect such temperature control, appropriate heater means are provided associated with each of the mold belts. Referring to FIGS. 1A and 2A, longitudinally extending heater assemblies 131 are disposed below the lower reach 69 of the mold belt-chain drive assembly adjacent the input end of the apparatus in the positions generally indicated in FIG. 1A. When the heaters are energized, the lower reach of the mold belt and chain assembly is heated to a temperature appropriate for the material being molded, as will hereinafter be explained in greater detail. Appropriate controls are provided to retain the temperature within close limits.

With respect to mold belt 101, there is provided a heater assembly 132 mounted above the upper reach of the mold belt as illustrated in FIGS. 1A and 2A. As with the heater assemblies 131, appropriate controls are provided to maintain the temperature of the associated mold belt relatively constant, or within appropriate limits for the particular product being molded and cured.

It should also be noted that heater assemblies 131 and 132 are placed adjacent the input end of the apparatus so that there will be a minimum of heat loss from the mold belts prior to injection or deposition of the product to be molded, thereby increasing the degree of control over molding and curing temperatures in the mold cavity. The heater assemblies are sectionalized and independently controlled to provide "base" heater units that are on at any time that heat is required, "warm-up" heater units that are turned on initially along with the "base" heaters but which are switched off when optimum temperature has been reached, and "maintenance" or "close control" heater units which switch on and off as needed to maintain the temperature of the mold belts within a narrow range.

As indicated by way of example in FIGS. 5 and 14, one product to be produced by this apparatus comprises an elongated strip of molding of the type used to trim door and window frames. Since molding will be produced in a continuous strip by the apparatus of this invention at a selected rate appropriate to and in large measure determined by various parameters, it is necessary that operation of the apparatus be monitored so that remedial action may be taken without delay when one of the functions of the apparatus is performed outside the permissible limits of a given parameter.

To effect such control, the apparatus is powered from an AC source of electrical energy, preferably a 220V supply, connected to a step-down transformer 141 opposite ends of the secondary of which are connected to main leads 142 and 143. In the interest of simplicity and brevity, the control circuitry is illustrated in a line-to-line schematic in which each of the functions to be performed constitutes a load circuit appropriately interposed between leads 142 and 143.

For maximum safety in the operation of the apparatus and the control of each of its functions, the control circuit is arranged to provide sequential interlocks between the various functions to be performed so that the operator of the apparatus is required to activate the various functions in proper sequence. The circuitry is also arranged so that if a failure occurs in any one of the functions, every other function of a higher order than the function in which the failure has occurred is automatically deactivated, requiring that the cause of the failure be determined and remedied and the apparatus again energized in a sequential manner.

To initiate operation of the machine, the main disconnect power control switch (not shown) is closed to the power feeders, thus energizing transformer 141 and leads 142 and 143. Fuse 144 is inserted in lead 142 to protect the circuit elements. As soon as power is applied to the circuit, a green indicator light 146 is energized to indicate to the operator that the power is "on."

Because in many instances the materials to be dispensed and formed in the apparatus may be volatile or toxic, it is important that the area in which the apparatus is to be operated be kept as free as possible from volatile and toxic vapors and fumes. Accordingly, the control circuit includes an exhaust fan control portion or "sequence" (FIG. 13A) designated generally by the numeral 147. Details of the fan sequence 147 and the mechanical and functional interrelationship of some of the components included in this fan sequence with components included in other sequences is described hereinafter in greater detail.

The next "sequence" in order of importance is the control sequence designated generally by the numeral 148 and including an infrared remote temperature sensing unit 149 and remotely controllable clutch-brake units 151. The infrared remote temperature sensing unit 149 may be purchased as a commercial item sold by Raytek, Inc., Division of Optical Coating Labs., Inc. under the trade name "Thermalert." The clutch-brake control unit 151 includes a photoelectric relay sold commercially by Farmer Electric Products Company, Inc. under the trade designation "TR4" to produce a "one-shot" relay operation cooperating with a power supply equipped with a single torque dial to effect control of a clutch mechanism for purposes which will hereinafter be explained. A power supply found to be satisfactory is sold commercially by Warner Electric Brake and Clutch Company under the trade designation "MCS-103." Other equivalent power supplies may of course be used.

The control unit 151 also includes a two dial pulse operated switching unit for alternately controlling a brake and clutch in the cutoff mechanism as will hereinafter be explained in conjunction with operation of the apparatus. Such a unit may be purchased commercially from Warner Electric Brake and Clutch Company under the trade designation "MCS-117."

The drive sequence 152 is manually activated by the operator following proper activation of previous sequences and after observance of a visual signal indicating that activation of the apparatus thus far has progressed in the proper order and that activated sequences are in proper operating condition. The drive sequence control includes 10 horsepower DC motor 121 previously discussed, which is driven through a suitable silicon controlled rectifier (SCR) control unit. It has been found that a General Electric shunt-field type DC motor for variable armature voltage operation in conjunction with a three-phase (input) full wave, silicon controlled rectifier control which provides a variable voltage supply to the motor armature and a fixed DC voltage to the motor field is satisfactory. Such an SCR control unit may be purchased commercially from the Boston Gear Division, North American Rockwell, sold under the trade designation "Ratiotrol Systems Model T210." Motor speed is controlled by an appropriate potentiometer 153 as will be described.

The next sequence in order of importance (FIG. 13B) is the heat sequence 154 which cooperates with the infrared remote temperature sensing unit 149 to provide close control over the temperature of the mold belts during operation. To effect such close control, the heat sequence includes three sets or sections of cooperatively related heater units including warm-up heaters, base heaters and maintenance heaters. It is the function of the warm-up heaters to initially bring the mold belts to operating temperature. The base heater units maintain a predetermined degree of heat in the mold belts, while the maintenance heaters operate to reduce or narrow the range of fluctuation of heat in the mold belts. Appropriate sensing means and visually discernable signal means are provided to indicate whether the mold belts are too cold, too hot, or at a proper temperature to permit proper operation of the apparatus.

The motor sequence 155 includes control circuitry directed specifically to the operation and control of equipment which forms no part of the subject invention, but which nevertheless operates in conjunction with the apparatus of this invention so as to enable expeditious handling of the product produced by the apparatus. For instance, inasmuch as the product to be produced by the apparatus constitutes an elongated and continuous strip, it is necessary for convenient usage of such strip material that it be cut to convenient lengths. Accordingly, a cutoff mechanism is operable in conjunction with the subject apparatus to effect such a cutoff function.

The motor sequence 155 thus controls operation of the cutoff mechanism which works in conjunction with appropriate conveyors and a refrigeration unit interposed between the cutoff mechanism and the discharge end of the apparatus so as to rapidly cool the product as it is discharged. In the interest of completeness of this description, the detailed operation of the motor sequence circuit components including the cutoff mechanism will be explained in detail hereinafter.

Prior to operation of the apparatus to produce the product discussed above and illustrated in FIG. 14, it is advantageous that the mold belts 55 and 101 be heated to a predetermined temperature. For instance, in molding rigid elongated strip product from polyurethane foam, it is convenient that the mold temperature be held as close to 180°F as possible.

In addition to temperature control, however, the molds may be conditioned by applying thereto an appropriate parting agent applied to the mold surfaces by spray nozzles (FIG. 1A) arranged to spray an appropriate oil base compound of the heated mold belts at the discharge end of the apparatus. Where desired, the parting agent may also function as a finishing compound to color the product with selected pigments. For instance, it has been found that an oil base walnut stain is satisfactory for this purpose. Such mold belt conditioning by the application of a spray is controlled through the mold conditioner and pump sequence 156 which, as will hereinafter be explained, includes appropriate switch means to effect automatic operation of the mold conditioning means.

When each of the previously discussed sequences has been properly initiated, and when the visually discernible signal means indicate that all of the sequences are functioning properly, the plastic delivery sequence 157 may be activated so as to "condition" the mixing and dispensing equipment illustrated in FIG. 1 in preparation for dispensing of the synthetic resinous material into the mold cavities. It should be noted that the plastic delivery sequence control circuitry does not per se effect initiation of the mixing and dispensing apparatus, but rather merely "conditions" such apparatus so that its operation may be initiated as desired by the operator.

In the operation of the apparatus, it is important that the mold belts 55 and 101 be properly positioned so that the faces of the mold belts engage with an applied pressure appropriate to the material being molded. For polyurethane foam, it has been found that a pressure of approximately 5 lbs. per square inch is satisfactory. To effect such adjustment of the mold belts, an upper mold belt elevator or jack control circuit 158 is provided adapted to control operation of the elevator or jacking motors 35 controlling rotation of elevator spindles 32. As previously discussed, the jacking motors may be equipped with a torque limiting clutch assembly and a motor shaft brake for quick, accurate and effective control of movement of the auxiliary frame. Latch rods 117 may also be used to impose the requisite pressure between the mold belts.

As indicated above in connection with the control sequence 148, the control of the cutoff mechanism illustrated in dash lines in FIG. 1 and in block diagram form in FIG. 1A, is controlled by a cutoff control circuit 159 which in the interest of completeness of this description will be explained in conjunction with explanation of the operation of various of the control circuits. It should be understood, however, that the cutoff mechanism and its control circuits, while operable in cooperation with the subject matter of the present invention, constitutes a separate invention forming the subject matter of a separate application assigned to the assignee of the present invention. For clarity of description, each of the foregoing "sequences" or control circuit portions is described below under appropriate headings.

ACTIVATION

Referring to FIGS. 13A, 13B, 13C and 13D, it will be seen that in these views the various sequences 147, 148, 152, 154, 155, 156, 157 and 158 are arranged in the order of their activation. After energizing the circuit by closing the main disconnect switch and noting that the light 146 shows green, the fan sequence "start" button (B1) is pressed. The multiple-pole key operated switch S3 is provided for servicing functions and contacts A-B are normally closed as shown.

Completion of the circuit through the contacts A-B of switch S3 enables energization of the exhaust fan sequence 147 by depression of the switch button B1, thus completing a circuit between terminal point 161 on lead 142 and terminal point 162 on lead 143. Interposed between these two main leads is normally closed push button switch B2 which must be manually depressed if it is desired to effect interruption of the circuit between terminal points 161 and 162. It should be understood that the push button switch B1 is spring pressed in a normally open position and need only be depressed momentarily to complete the circuit between terminal point 161 and 162.

Such momentary completion of this circuit has the effect of energizing the coil C1 of an exhaust fan starter switch the contacts 163 of which are normally open but are closed by energization of the coil C1, and "sealed" in closed condition so long as current flows through the circuit. It will thus be seen that the momentary depression of the switch B1 causes closing of the switch contacts 163, which then completes the circuit through lead 164 and push button switch B2 so as to maintain the exhaust fan in operation.

The exhaust fan is mounted in an appropriate duct through which air is exhausted to the outside atmosphere. As soon as air starts flowing through the duct, the kinetic energy of the moving air mast effects closing of the normally open switch 166 so as to energize a timer device T1 connected in parallel with the Coil C1 of the exhaust fan switch and adapted to provide an adjustable approximately 1 minute delay before activating switch contacts 167 associated with the timer. The closing of switch contacts 167 effects energization of the "exhaust on" green light 168. As soon as this light comes on, the operator then knows that the exhaust circuit including the exhaust fan motor drive is operating properly so as to suck deleterious fumes from the area of the apparatus.

Simultaneous with closing of the switch contacts 167 upon expiration of the 1-minute delay provided by the timer T1, switch contacts 169 are also closed, thus setting the stage for completion of a circuit between terminal points 171 and 172. Included in the circuit between these terminal points is a normally open push button switch B3, a normally closed push button switch B4, switch contacts 167 and 169 controlled by the timer T1, and a relay R1 which includes a coil-actuated armature operable to close the normally open contacts A-B and C-D of the R1 relay to complete a circuit therethrough so as to thus energize green indicator light 173. It should be noted, however, that expiration of the time delay interposed by timer T1 does not automatically effect actuation of relay R1. To actuate this relay, it is necessary that the operator manually depress normally open push button switch B3. Push button switch B3 needs only be depressed momentarily, the circuit through relay R1 thereafter being maintained by the latching characteristic of the relay R1 circuit.

Prior to the activation of the relay R1, power was precluded from energizing subsequent "sequences" 148 through 157 because of the open condition of contacts A-B and C-D of relay R1. With illumination of indicator light 173, the operator is advised that all subsequent sequences downstream from the fan sequence are connected to the source of power and may be activated.

Referring to FIG. 13A, and specifically to the control sequence 148, the infrared remote temperature sensor unit 149 may conveniently be of the type sold under the trade name "Thermalert," Model No. R200A sold commercially by Raytek Incorporated. It is the function of this unit to sense the temperature of the mold belts from a remote point and to control the heat sequence in a manner to be described in connection with that portion of the circuit. At this point it is sufficient to say that when the green "operate" indicator light 173 is illuminated, the control unit 149 conditions the heat sequence control circuit 154 in preparation for manual initiation of operation by the operator.

It is important to note that adjustable controls are provided in the control unit 149 to selectively adjust the temperature of the mold belts to any temperature appropriate for the material being run and within the critical temperature limitations of the mold material itself. For instance, for polyurethane foam material, the temperature of the mold belts is preferably held at approximately 180°F.

Figure 13B:
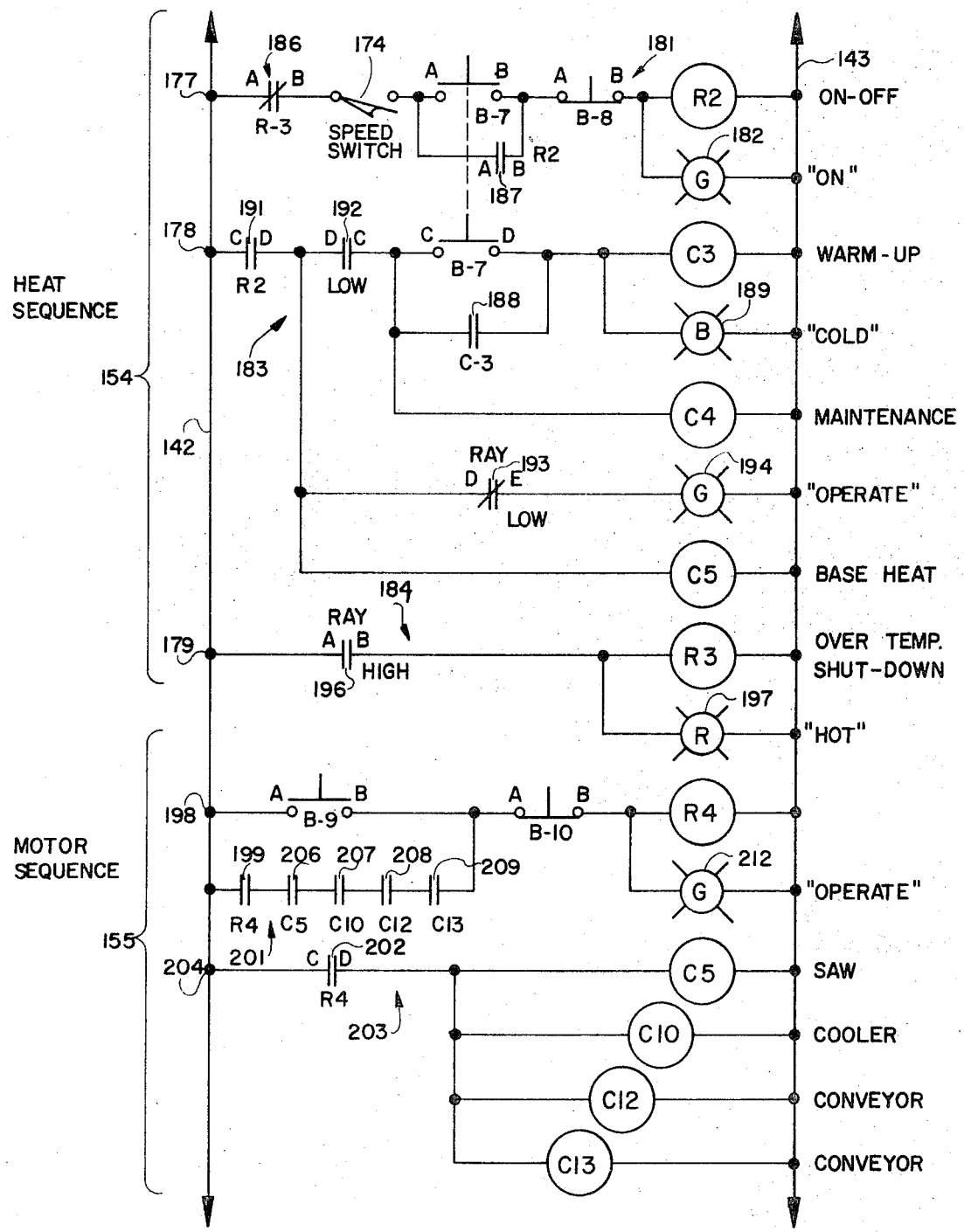
FIG. 13B is a continuation of the line-to-line schematic illustrated in FIG. 13A and showing another portion of the control circuit.
Figure 13C:
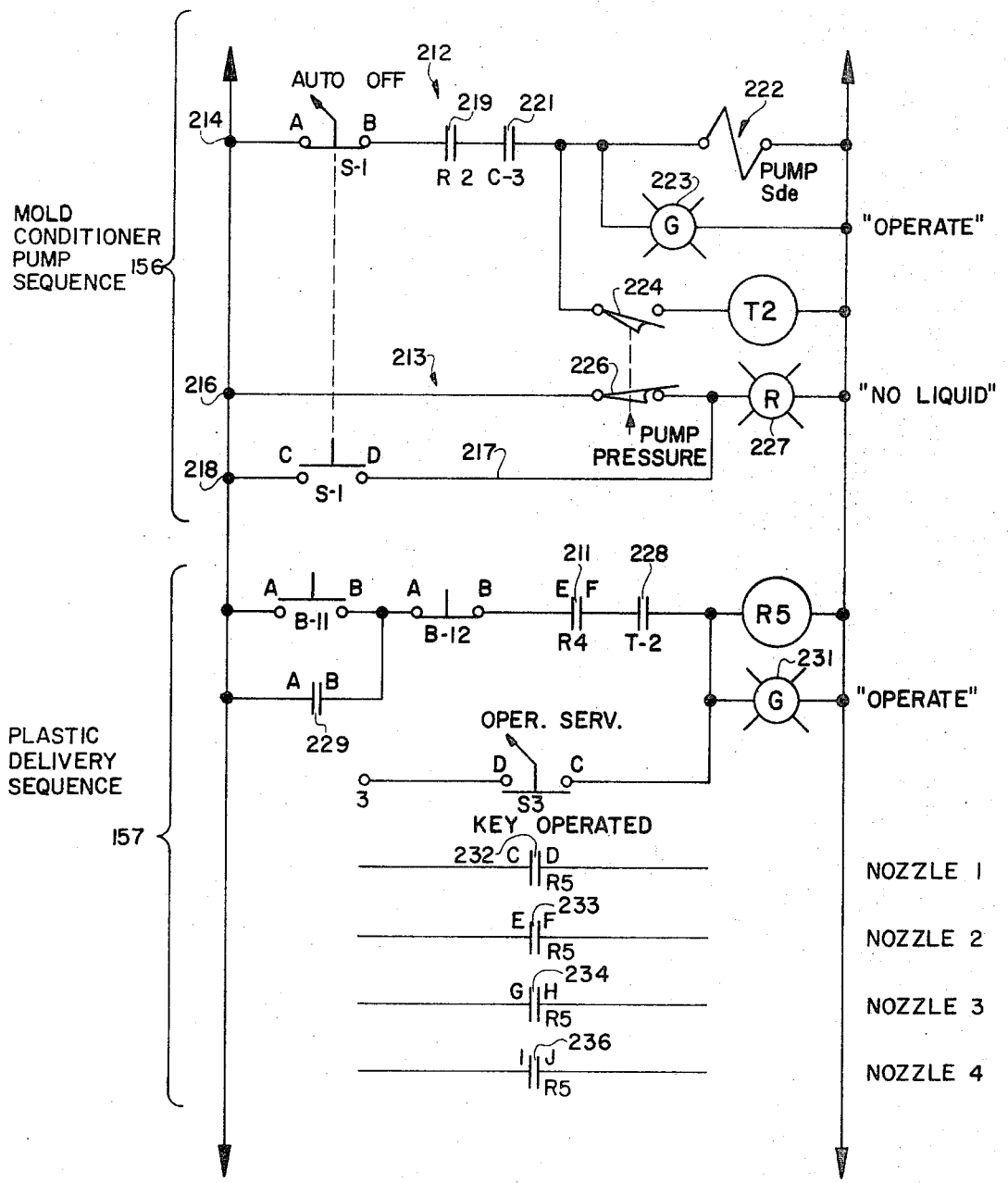
FIG. 13C is a continuation of the line-to-line schematic illustrated in FIG. 13B.
Figure 13D:
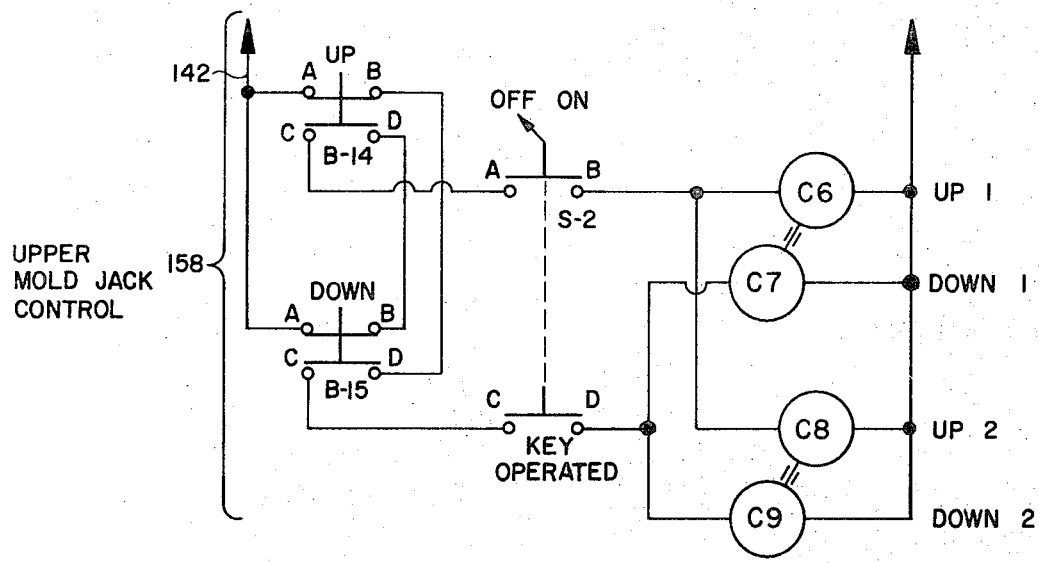
FIG. 13D is the terminal end of the line-to-line schematic of the control circuit.
Figure 13E:
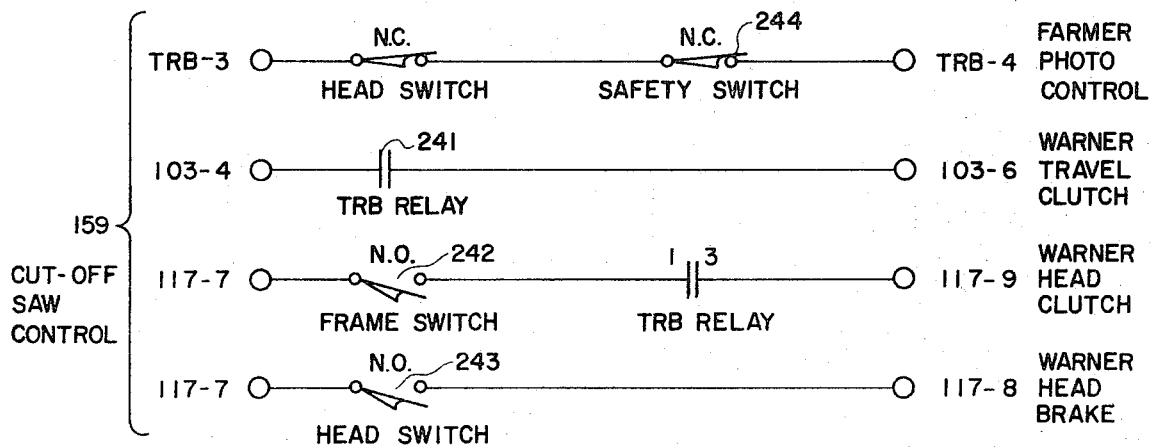
FIG. 13E is a schematic illustration of the control circuits controlling the cutoff mechanism at the discharge end of the apparatus.

Also indicated as a part of the control sequence circuit 148 is the power control unit 151 illustrated in greater detail as to its component parts in the cutoff saw control circuit 159 shown in FIG. 13E. The functions performed by these various components and their interrelationship with other functions and components will be explained in detail in connection with that portion of the circuit.

DRIVE SEQUENCE

As indicated above in connection with the general comments concerning the drive sequence 152, this circuit energizes the SCR controller for the main drive motor 121 and is activated in proper sequence following illumination of the "operate" indicator light 173 by manual depression of the push button switch B5 so as to close the normally open contacts A-B of that switch. Completion of a circuit through these contacts completes a circuit through the entire drive sequence control circuit inasmuch as the key operated switch S3 and its contacts E-F, as illustrated in association with push button switch B5 are already closed. Operation of the main drive motor 121 is thus initiated only after the operator has been given the indication that all other previous sequences are in proper condition for operation of the main drive motor.

The main drive motor 121 drives the mold belts at whatever speed has been selected as appropriate for the particular product being run. Mold belt speed control is effected through the potentiometer 153, the terminals of which are appropriately connected to the SCR controller. Even though the main drive motor has been activated and the mold belts are running, it may take the mold belts some finite period to reach appropriate mold belt speed, which in connection with the production of a rigid strip product from polyurethane foam, has been found to be approximately 25 feet per minute. Obviously, because of the mold belt speed control potentiometer 153, the speed of the belts may be controlled within very close limits. Inasmuch as the mold belts are raised to the appropriate temperature of approximately 180°F by exposure to heat radiated from the mold belt heater units 131 and 132, and since attainment of the predetermined mold belt temperature is dependent upon many variables, including the mold belt speed, the efficiency of heat transfer from the heater units to the mold belts, heat loss from the mold belts to associated structure and the length of time to which the mold belts are exposed to the radiated heat from the heater unit, it is important that subsequent sequences in the operation of the machine not be initiated until the mold belts are brought to the appropriate speed and temperature. With respect to mold belt speed, it is noted that activation of the heat sequence 154 is dependent upon the closing of the speed control switch 174, the closing of the contacts of which is controlled by a speed sensor unit 176 (FIG. 7) drive at all times that the mold belts are being driven by the main drive motor 121. A speed sensing unit found to be satisfactory is sold commercially by Allen-Bradley Co. under model No. 808-G1.

HEAT SEQUENCE

As indicated in FIG. 13B, the heat sequence control circuit 154 includes terminals 177, 178 and 179 in main lead 142. Appropriately connected to terminal 177 is a branch circuit designated generally by the numeral 181 and including the switch contacts 174 of the speed sensor unit 176. The branch circuit 181 may be generally described as the "on-off" circuit and includes a green indicator light 182 which must be illuminated before the next sequence in the control circuit may be activated. Branch circuit 181 operates in cooperation with a second branch circuit designated generally by the numeral 183 and connected to main line terminal 178.

The branch circuit 183 may in general be described as being the mold belt temperature control circuit and works in conjunction with the control unit 149 in the control sequence 148 to control activation of the various sets of heaters associated with the mold belt to provide a "warmup" cycle, a "maintenance", and a "base heat" cycle. The branch circuit 183 also works in conjunction with a third branch circuit designated generally by the numeral 184 which functions to shut down the machine when an over-temperature in the mold belts occurs.

Referring specifically to the branch circuit 181, it will be seen in FIG. 13B that this circuit includes a pair of normally closed switch contacts 186 forming a part of relay R3, the actuating coil of which is included in the branch circuit 184 as shown. Since the switch contacts 186 are in normally closed condition, and since the contacts 174 will be closed when the mold belts have achieved appropriate speed, it will be seen that all that is required for the operator to do is depress the push button switch B7 so as to close the contacts A–B in branch circuit 181, to effect energization of the coil in relay R2 which in turn closes the switch contacts 187 of this relay so as to effect illumination of the green indicator lamp 182.

Preferably, the push button switch B7 is depressed only momentarily and the switch contacts 187 are "sealed" in a closed condition by the passage of current through the circuit. If for some reason current flow through the branch circuit 181 is interrupted, the switch contacts 187 automatically open, thus interrupting the circuit and requiring depression of the push button switch B7 to re-energize the circuit. When the green indicator lamp 182 has been illuminated, the operator is advised that the next step in the activation sequence may be taken.

It should be noted that push button switch B7 also includes switch contact C–D included in branch circuit 183. When the push button switch B7 is depressed, contacts C–D are momentarily closed, thus energizing the coil C3 which controls normally open sealing contacts 188. The contactor C3 is energized and sealed in closed position by the flow of current through contacts 188, a part of the contactor, to thus illuminate the blue indicator lamp 189 so long as the mold temperature sensing device 149 indicates that the temperature of the mold belts is "cold." Upon the molds reaching operating temperature, the Raytek control 149 opens contacts 192, removing power from C3. This contactor opens contacts 188 and remains off during the remainder of operation of the molding process.

It should also be noted in connection with branch circuit 183 that energization of this circuit depends primarily on closure of normally open contacts 191 controlled by relay R2. As soon as the contacts 191 are closed, it immediately energizes the contactor coil C5 to close a pair of contacts (not shown) to energize the base heater units associated with the mold belts. The base heater units are the units that are primary in the heat cycle in that these heater units are energized if any of the heater units are energized. In other words, the base heater units are always in energized condition when it is desired that the mold belts be heated.

After closure of contacts 191, it will be seen that energization of the "warmup" heater units is controlled by the Raytek control unit 149 through switch contacts 192. Thus, if the sensor unit 149 senses that the temperature of the belts is too low, then the contacts 192 are closed, the "warm-up" heater units are energized and the blue indicator lamp 189 is illuminated to indicate that the circuit is energized and that the mold belts are "cold." Additionally, closure of the contacts 192 energizes contactor coil C4 which controls a pair of switch contacts (not shown) associated with a "maintenance" heater unit adapted to maintain the temperature of the mold belts at approximately the desired predetermined operating temperature.

With the passage of time and the application of heat from the three sources, namely the "warmup," "maintenance" and "base" heater units, the mold belts will reach optimum temperature in approximately 10 to 15 minutes and the temperature sensing device 149 will effect closure of the normally open switch contacts 193 so as to energize the green indicator lamp 194. Illumination of this lamp indicates that the mold belts have reached optimum temperature and that operation of the apparatus may proceed.

It may be that for some reason the temperature of the mold belts will exceed the upper permissible limit. When this occurs, the heat sensing device 149 senses the over-temperature condition and closes the contacts 196 included in the branch circuit 184. Closure of the contacts 196 effects energization of the coil in relay R3, thus opening the normally closed contacts 186 in branch circuit 181 so as to shut off the heat units and permit the mold belts to cool. Simultaneous with energization of relay R3, red indicator lamp 197 is illuminated to provide a visual indicator to the operator that the mold belts are "hot." Assuming, however, that the mold belts are brought to optimum temperature and retained within the permissible range of temperatures, the green lamp 194 indicates to the operator that he may then proceed to the next sequence.

MOTOR SEQUENCE

Referring to FIG. 13B, specifically the motor sequence 155 thereof, this control circuit includes a terminal 198 to which is connected one contact A of a push button switch B9 which when momentarily depressed by the operator effects energization of the relay R4 and closes the normally open contacts 199 of this relay found in the branch circuit 201, and closes the normally open switch contacts 202 in the branch circuit 203 connected to terminal 204 on main line 142, so as to energize the coils C5, C10, C12 and C13 each of which in turn controls actuation of normally open switch contacts 206, 207, 208, and 209.

These latter switch contacts are interposed in the input circuits for the cutoff mechanism illustrated in FIG. 1, the cooler device interposed between the discharge end of the subject apparatus and the cutoff mechanism, and a pair of conveyors which receive the product from the subject invention and carry it through the cutoff mechanism. Energization of the relay R4 also has the effect of closing normally open contact 211 in the plastic delivery sequence circuit 157 illustrated in FIG. 13C. It will thus be seen that the momentary actuation of the push button switch B9 sets the stage to provide fail-safe operation of all of the components controlled by switch contacts 206–211.

Thus, since the contacts 199 are retained in closed condition by virtue of the flow of current therethrough to relay R4, that is, they are "sealed" in closed condition, any interruption of the current through such contacts, such as the interruption of operation of any one of the motors controlled by switch contacts 206–209 causes the entire motor sequence control circuit to be turned off, thus preventing operation of the saw, cooler and conveyors. In addition, the contacts 211 in the plastic delivery sequence 157 (FIG. 13C) will shift to "off" condition and prevent synthetic resin from being fed into the mold belts when the remainder of the apparatus is not "conditioned" to receive it. As with the other sequences, normal operation of the motor sequence effects illumination of the green indicator lamp 212 and the operator is again advised that he may proceed to the next sequence.

MOLD CONDITIONER PUMP SEQUENCE

The mold conditioner pump sequence 156 (FIG. 13C) includes a pair of branch circuits 212, 213, tied respectively to main line terminals 214 and 216. The branch circuit 212 constitutes a load circuit and includes a double pole-single throw selector switch S1 having contacts A–B interposed in branch circuit 212, and contacts C–D interposed in shunt lead 217 connected at one end to main line terminal 218 and at its other end connected to branch circuit 213. Following energization of the motor sequence circuit 155, and observing that the green indicator lamp 212 is illuminated, the operator switches the selector switch S1 to the "auto" position as illustrated in FIG. 13C, thus completing a circuit through the contact A–B.

Also included in branch circuit 212 are a pair of normally open contacts 219 controlled by actuation of the relay R2 illustrated in FIG. 13B in the heat sequence control circuit. Assuming that the relay R2 is energized so that the normally open contacts 219 are closed, it will be seen that the circuit is completed through these contacts and also through the normally open contacts 221 in branch circuit 212 and controlled by coil C3 in the heat sequence 154. It will thus be seen that operation of the mold conditioner and pump sequence control circuit is dependent upon proper "conditioning" of the R2 relay and C3 coil and switch assembly in the heat sequence 154. Assuming the proper conditioning, closure of the contacts A-B in selector switch S1 effects energization of the pump solenoid 222 and energizes green indicator lamp 223, thus indicating to the operator that the mold conditioner is in operating condition.

As pressure builds up due to operation of the pump, the pressure in the lines to the mold conditioner spray heads associated with the discharge end of the apparatus (FIG. 1A) increases to the point where the pressure actuates pump pressure switch 224, thus closing the circuit through the timer T2 and simultaneously opening switch contacts 226. As soon as contacts 226 are opened, the red indicator light 227 is extinguished. Energization of the timer T2 for a period of approximately three minutes results in switch contacts 228 in the plastic delivery sequence control circuit 157 being closed so as to "condition" that sequence to proper operation.

It should be remembered that as soon as the pump pressure switch 224 has been closed, this indicates that the pump pressure for the mold conditioning material is sufficient to effect spraying of the mold belts with the conditioning material, which as previously explained, may function as a parting agent and stain for coloring purposes. During this operation, the mold belts are rotating at optimum speed, and because the heat sequence control circuit is in a "green" condition, all functions are operating normally and the apparatus is ready for energization of the plastic delivery sequence 157 as soon as the coated portion of the mold reaches the plastic delivery point.

If at any time the pump pressure should drop below the optimum level, the timer T2 is de-energized and the plastic delivery sequence is automatically cut off by interruption of the flow of current through T2 contact 228. Simultaneously, the red indicator light 227 will be turned on, thus indicating to the operator that the machine must not be run. If the selector switch S1 is switched to the "off" position, the contacts C-D in shunt circuit 217 close and cause illumination of the red indicator lamp 227, thus again warning the operator that the apparatus must not be run.

PLASTIC DELIVERY SEQUENCE

The operator now observes that all of the green indicator lamps associated with previous sequences are illuminated and knows that he may initiate the plastic delivery sequence by momentary depression of the push button switch B11. Switch contacts 211 controlled by relay R4 and switch contacts 228 controlled by timer T2 have been closed by those conponents so that the circuit is completed to energize the relay R5. The momentary depression of the push button switch B11 and energization of the relay R5 closes normally open contacts 229 which are "sealed" in closed condition by passage of current therethrough. Push button switch B11 may thus be released by the operator who observes that the green indicator lamp 231 is illuminated, thus indicating that synthetic resinous material may now be dispensed into the mold cavities.

Energization of the relay R5 effects closing of the switch contacts 232, 233, 234 and 236, associated, respectively with nozzles 1, 2, 3 and 4 forming a part of the mixing and dispensing equipment positioned at the input end of the apparatus. These latter contacts 232–236 are in series with the nozzle control buttons (not shown) which must be depressed by the operator to effect dispensing of the synthetic resinous material from each of the nozzles. Stated another way, closing of the switch contacts 232–236 "conditions" the nozzles for energization by depression of appropriate nozzle control buttons within the selective control of the operator.

It sometimes happens that the synthetic resin dispensing nozzles must be serviced without operating the apparatus. To effect such servicing, the key operated selector switch S3 is shifted to its "service" position, thus closing the contacts D–C (FIG. 13C) of the selector switch S3, permitting operation of the nozzles, but interrupting the operation of the remainder of the apparatus by opening contacts A–B of the selector switch S3 in the main lead 142 as illustrated in FIG. 13A. As shown, contact terminal D is connected directly to contact terminal A of the switch S3 so as to permit such limited operation of the nozzle assembly.

Thus "conditioned" the apparatus can run indefinitely to produce a continuous strip of rigid synthetic resinous material such as illustrated in FIG. 14 having an internal density of approximately 8 pounds per cubic foot and a "skin" density of approximately 12 pounds per cubic foot. Preferably, the denser skin material is approximately one thirty-second of an inch in thickness. It will thus be seen that a nominal speed of 25 feet per minute, approximately 48 thousand linear feet per 8 hour day may be produced with an apparatus equipped with four separate continuously operating mold cavities.

UPPER MOLD ELEVATOR CONTROL

As indicated above in connection with the discussion of the auxiliary carriage on which the upper mold belt 101 is rotatably mounted, to effect removal and replacement of mold belts and to adjust the pressure between the mated mold belts, the upper mold belt and its supporting auxiliary frame may be elevated or lowered by energization of the upper mold elevator control circuit 158, illustrated in FIG. 13D. Prior to initiation of the elevator control circuit 158, however, it is necessary that the latch rods 117 which normally lock the auxiliary frame in fixed relationship with respect to the main frame be unlatched from the lock lugs 37 as illustrated in FIG. 9. If desired, electrical interlocks may be provided so that the elevator control circuit may not be energized until all of such mechanical locks have been disengaged.

Assuming such mechanical disengagement, the upper mold elevator control circuit 158 is initially energized by switching a key operated selector switch S2 from the off position illustrated in FIG. 13D to the on position in which the contacts A–B and C–D, normally held open, are placed in closed condition. Selector switch S2 works in conjunction with double-pole, double-throw push button switches B14 and B15. The switch B14 is utilized to energize the elevator circuits so as to raise the auxiliary frame and mold belt thereon, while the push button switch B15 is utilized to lower the auxiliary frame and the mold belt.

The push button switch B14 in its normal condition stands with its contacts A–B in closed condition. In like manner, the contacts A–B of push button switch B15 controlling the downward movement of the auxiliary frame are in normally closed condition. Thus, following actuation of selector switch S2 to its on position (thus completing a current path through the contacts A–B and C–D of that switch) depression of the push button switch B14 to effect raising of the auxiliary frame closes the contacts C–D of push button B14, thus completing a circuit sequentially through the main lead 142, contact terminals A–B of down switch B15, contact terminals C–D of up switch B14, and switch contacts A–B of the main selector switch S2.

Completion of the circuit through this path effects energization of the coils C6 and C8 associated with the three phase circuitry used to drive the elevator motors 35. It should be noted that push button switch B14 must be held in depressed condition for as long as necessary to raise the auxiliary frame. When the push button is released, the circuit is broken and movement of the auxiliary frame ceases almost instantly due to the operation of a brake mechanism (not shown) incorporated into the apparatus.

To lower the auxiliary frame, the down push button B15 is depressed so that a circuit is completed through main lead 142, contact terminals A–B of the up push button B14, switch contacts C–D of the down push button B15 and thence through the contact C–D of selector switch S2. This completes a circuit through the magnetic controllers C7 and C9 which are in turn connected to the three-phase circuitry utilized for driving the jacking motors 35 in a direction to effect downward movement of the auxiliary frame. It will thus be seen that there is not only a mechanical interlock with respect to adjustment of the position of the auxiliary frame in the upper mold belt, but an electrical interlock which effectively prevents inadvertent operation and therefore shorting of the three-phase circuitry which drives the jacking motors.

CUTOFF DEVICE CONTROL SEQUENCE

As indicated above, the control unit 151 illustrated in FIG. 13A embodies control components for controlling actuation of the cutoff saw through energization and de-energization of a pair of clutches and one or more brake units. While the details of design of the cutoff saw do not form a part of the subject invention, it is believed that in the interest of clarity of description, the interrelationship of the control unit 151 and the functions performed by the saw should be described herein.

Accordingly, referring to cutoff saw control sequence 159 in FIG. 3E, it is the purpose of the cutoff saw control mechanism to sense the end of a length of rigid plastic strip material after it has emanated from the apparatus a predetermined length, initiate movement of an auxiliary frame on which the saw blade is mounted for movement at the same speed as the plastic strip, and thereafter energize the saw to swing a saw blade so as to cut the plastic piece off at the correct length. These functions are performed by the four circuits generally designated as cutoff saw control sequence 159.

As material emanates from the apparatus, it passes longitudinally through the cutoff mechanism illustrated schematically in FIGS. 1 and 1A, and after a predetermined length of the material has passed through the mechanism, the end of the material is sensed by an appropriate photoelectric cell (not shown) including a light beam projected across the path of travel of the elongated strip. When the light beam is interrupted, the TRB-4 relay previously identified is actuated, closing contacts 241 to complete a circuit through and energize a travel clutch (not shown) in the saw mechanism to initiate movement of the auxiliary frame carrying the saw blade at the same speed as the strip material.

As soon as the auxiliary frame starts moving, normally open cam-operated frame switch 242 is closed, resulting in energization of the Warner saw head clutch which controls orbital swinging movement of the saw blade through the material to be cut. Before the saw blade has completed one complete revolution, the saw head switch 243 is mechanically operated to switch the electronic circuitry of the Warner controls so that the saw control clutch is automatically de-energized and a saw head brake (not shown) is simultaneously imposed, thus bringing the saw head to a stop. The saw head switch also turns to off condition the latch to the TRB photo control relay and de-energizes this relay. As soon as the photo control relay is de-energized, the travel clutch is also de-energized and a heavy spring (not shown) returns the auxiliary frame carrying the saw blade to its original position.

The frame switch is cam-actuated during this return motion, but there is no responsive reaction by the saw head clutch because the TRB relay contacts 1–3 are open. Safety switch 244 is provided in the TRB relay circuit to automatically return the auxiliary frame to its initial position if a malfunction occurs in the head switch or if the saw motor is not working.

It will thus be seen that from beginning to end, the apparatus is under substantially complete control through sequential operation of its various sequences. In this manner, once the apparatus has been "set up" for a particular product and for a particular material, the apparatus may be operated continuously with only nominal supervision.

Referring to the product illustrated in FIG. 14, the strip molding is elongate and rigid in both a longitudinal and transverse direction. We have found that a chemical compound formulated from a polymer with a glucose base and an isocyanate mixed in the proportions by weight of 54 percent of the polymer and 46 percent of the isocyanate produces a rigid product highly resistant to chipping. Preferably, the mold belt temperature is raised to a predetermined optimum for the compound used, say 180°F for polyurethane foam.

With the mold belts running at approximately 25 feet per minute, the compound is dispensed from the mixing and dispensing apparatus directly into te mold cavity. For a two-component compound, we have found that mixing and dispensing equipment sold commercially by Admiral Equipment Corporation under the trade designation Type 120-2P is satisfactory.

As shown schematically in FIG. 2A, the dispensing head 251 pours the compound to be molded onto the lower mold belt just before it mates with the upper mold belt. In this manner, the compound is almost immediately confined within the closed moving cavity formed by the mold belts. For the material described, we have found that the entire cycle from deposition of bulk compound to discharge of finished product is completed in about 2 minutes.

When cured, the product varies in density from its inner core 252 (FIG. 14) to its outer skin 253. The inner core may possess a density of 8 pounds per square inch, for instance, while the skin may have a density of about 12 pounds per square inch. The skin thickness may vary from one thirty-second to one-sixteenth inch. It should be understood that these parameters may be changed to provide different densities and skin thicknesses according to the nature of the material being run and the rigidity desired in the product. For instance, the density from the inner core to the outer skin may be a gradual increase in density maximized in the skin, or it may be an abrupt transition from one density to another.

Having thus described the invention, what is claimed to be novel and sought to be protected by letters patent is as follows:

1. Apparatus for continuously mixing, molding and curing synthetic resinous materials to produce a continuous elongated product therefrom comprising:
   a. mixing and dispensing apparatus for one or more chemicals in fluid form contained in a mixing chamber to produce a compound to be dispensed;
   b. molding and curing apparatus operatively associated with said mixing and dispensing apparatus to receive said compound as it is dispensed, said molding and curing apparatus including a pair of complementary mold belts arranged to form at least one mold cavity and into which said compound is dispensed and within which it is cured, said molding and curing apparatus including guide means for said mold belts, said guide means operatively associaed with said mold belts to form said cavity therebetween, means for driving the guide means associated with each of said mold belts at a speed substantially equal to the speed of said mold belts, heater means associated with each of said continuous mold belts to retain said mold belts at a pre-determined temperature; and,
   c. means for monitoring the speed of said mold belts and operable to energize said heater means when said mold belts have attained a pre-determined speed.

2. The combination according to claim 1 further including automatic cutoff means connected to said molding and curing apparatus and adapted thereon to receive said elongated product from said mold belts to effect cutting of said continuous elongated product into strips of predetermined lengths.

3. The combination according to claim 2, in which control means are provided effective to control said mixing and dispensing means in correlation to operation of said molding and curing apparatus and automatic cutoff means whereby the entire apparatus is shut down if predetermined parameters for operation of the apparatus are not met.

4. The combination according to claim 3, in which said control means comprises a plurality of sequentially operable control circuits required to be activated in a predetermined order to effect activation of the apparatus.

5. The combination according to claim 3, in which said control means comprises a plurality of sequentially arranged control circuits interdependently associated to require activation in a predetermined sequence and including switch means in each control circuit whereby a failure in any given control circuit results in deactivation of all control circuits previous in sequence.

6. The combination according to claim 1, in which means are provided operatively associated with said heater means to sense the temperature of said mold belts and control energization of said heater means in response to said temperature.

* * * * *